US005942333A

United States Patent [19]
Arnett et al.

[11] Patent Number: 5,942,333
[45] Date of Patent: Aug. 24, 1999

[54] NON-CONDUCTIVE COATINGS FOR UNDERWATER CONNECTOR BACKSHELLS

[75] Inventors: Shawn L. Arnett; Alan V. Bray, both of Austin; John W. Bulluck, Spicewood; Christopher P. Thornton; Rock A. Rushing, both of Austin, all of Tex.

[73] Assignee: Texas Research Institute, Austin, Tex.

[21] Appl. No.: 08/410,805

[22] Filed: Mar. 27, 1995

[51] Int. Cl.[6] .......... B32B 9/00

[52] U.S. Cl. .......... 428/469; 428/461; 428/472; 428/701; 428/702

[58] Field of Search .......... 428/469, 472, 428/699, 701, 702, 461; 427/453; 439/519, 271

[56] References Cited

U.S. PATENT DOCUMENTS

| | | | |
|---|---|---|---|
| 3,864,093 | 2/1975 | Wolfla | 428/472 |
| 4,077,637 | 3/1978 | Hyde | 427/453 |
| 4,230,748 | 10/1980 | Patel | 427/453 |
| 4,341,841 | 7/1982 | Ohno | 428/472 |
| 4,410,598 | 10/1983 | Kuzel | 428/472 |
| 4,412,377 | 11/1983 | Nagashima | 427/453 |
| 4,967,686 | 11/1990 | Mottet | 427/453 |
| 5,224,572 | 7/1993 | Smolen, Jr. | 428/472 |
| 5,338,577 | 8/1994 | Burdette, II | 427/453 |

*Primary Examiner*—Timothy M. Speer
*Attorney, Agent, or Firm*—Arnold White & Durkee

[57] ABSTRACT

Metal surfaces treated with non-conductive metal oxides having enhanced non-conductive characteristics are disclosed. Durability and bond strength to polymer and metal surfaces is improved relative to non-treated metal surfaces. Methods of using metal surfaces with at least one non-conductive metal oxide coating in marine and under water applications are also described wherein cathodic delamination at the metal surface and a polymer is reduced, thus increasing the relative useful life of devices whose metal surfaces have been so treated. Methods for increasing bond strength and adhesiveness between metal surfaces wherein the metal surface is treated to include a metal oxide coat, such as a mixture of aluminum oxide and titanium oxide, are also described. The non-conductive metal oxide, or other non-conductive metal nitrides, carbides, borides or fluorides, coatings include at least about 20% to about 100% of the non-conductive metal oxide.

20 Claims, 11 Drawing Sheets

NON-CONDUCTIVE COATINGS FOR UNDERWATER CONNECTOR BACKSHELLS

This invention was made with government support under NOOO24-93-C-4124 awarded by the U.S. Navy, Naval Sea Systems Command. The government has certain rights in the invention.

FIELD OF THE INVENTION

The invention in general relates to improved metal surface treatments and, more particularly, to devices such as underwater electrical connectors which are used in a sea water environment. The presently disclosed invention provides devices having an enhanced resistance to elastomer-to-metal adhesive bond degradation, particularly the process known as cathodic delamination. In that the present invention also provides methods for enhancing bond strength and durability at metal-metal and rubber-metal interfaces, the invention also relates generally to the field of methods for enhancing these types of bonds using particular surface metal treatments.

BACKGROUND OF THE INVENTION

Underwater connectors are utilized for structural terminations and circuit interconnections of electrical power and signal cabling systems. Such connectors can be found in underwater stationary platforms, submarines and other submersible vehicles or surface vessels, by way of example.

One common type of connector includes a metal shell (aka, connector plug, shell body or backshell) through which extends one or more conductors utilized for the transmission of electrical power or electronic or fiber-optic signals. These types of connectors are typically insulated from water and other environmental conditions by means of a polymeric encapsulating material, or boot, applied to the outside of the shell. Common polymeric, or rubber or rubber-like, encapsulating materials are polyurethane, polyethylene, or polychloroprene molding compounds. The encapsulating material typically seals the connector shell to its associated cable and is attached and made watertight to each by polymer-to-polymer or polymer-to-metal adhesive bonds. Typically, such connectors in present use are prone to premature failures due to degradation of the adhesive bond between the molded polymer boot and the metal shell. Bond degradation allows the development of leak paths for water to ingress into the connector resulting in loss of electrical resistance or overt short circuiting.

Certain environmental conditions can accelerate the rate of the types of degradation described above. Studies have shown that the most serious form of adhesive bond degradation occurs in seawater when metal connector shells are attached, or coupled, with dissimilar metals whereby a galvanic cell is formed. This commonly occurs when the couple includes the connector and a sacrificial anode, usually made of zinc or aluminum, which is attached to the hull of a ship, or other platform structure, to prevent corrosion. In such a galvanic cell the hull or platform structure and connectors attached to it act as cathodes. Although the cathodes are protected from corrosion, the galvanic cell sustains an electrochemical reaction that is deleterious to polymer-to-metal adhesive bonds. The process whereby the electrochemical reaction degrades adhesive bonding is commonly referred to as cathodic delamination.

Cathodic delamination is an underwater connector failure mode associated with the use of zinc anodes for corrosion control of marine metal structures. An electrochemical potential is developed between the hull zinc anodes and the (typically) stainless steel or Monel backshells of connectors which are electrically connected to the hull. Salt water provides the electrolyte function in the cell. This cathodic activity provides free electrons at the cathode (the back shell metal surface). The electrochemical reaction which takes place is essentially independent of the type of metal used in the back shell as long as the reaction potential is high enough that electrons are transferred from the zinc to the backshell. The effect of the free electrons at the surface of the backshell results in the reaction:

$$\tfrac{1}{2}O_2+H_2O+2e \leftrightharpoons -2OH$$

The hydroxide ions which result cause a local rise in pH which is concentrated at the surface of the backshell. This highly basic local concentration attacks the adhesive bond between the boot and backshell and can cause complete delamination at the metal to boot interface. In a connector, this loss of adhesive bond can lead to catastrophic flooding failure from leak paths created between the boot and the backshell.

Since hulls are polarized with sacrificial zinc anodes for corrosion protection, most dissimilar metals that are coupled to them (e.g., connector backshell plugs) form cathodes and are "protected" from corrosion in the same manner as the remainder of the hull. The electrochemical process is an oxidation/reduction reaction and there is no net accumulation of charge.

Electrochemistry

Connectors and similar hardware are subject to an electrochemical potential as part of a large galvanic cell. Sea water serves as the electrolyte. The hull is a first order conductor between the zinc anodes and the metallic backshell cathodes, seawater is the second order conductor. The sacrificial anode metal (zinc) strips off electrons and fine ions migrate into the seawater. Accordingly, free electrons gather at the backshell surface (cathode). FIG. 1A and FIG. 1B shows the process schematically. A variety of reactions at the interface between the more-noble metal backshell and electrolyte (seawater) are possible:

$$2H_3O^++2e^- \leftrightharpoons H_2+2H_2O \text{ Hydrogen evolution} \quad (1)$$

$$\tfrac{1}{2}O_2+H_2O+2e^- \leftrightharpoons 2OH^- \text{ Hydroxide ion formation} \quad (2)$$

$$2H^++2e+\tfrac{1}{2}O_2 \leftrightharpoons H_2O \text{ Water formation} \quad (3)$$

$$M_aO_b+2bH^++ae^- \leftrightharpoons aM+bH_2O \text{ Metal solvation} \quad (4)$$

$$M^{n+}+nOH^- \leftrightharpoons M(OH)_n \text{ Metal hydroxide} \quad (5)$$

Reaction (1) predominates whenever the electrochemical potential is high (−1 volt or more) vs std calomel electr-de and reaction (2) governs in low voltage (-0.8 volts) situations with dissolved oxygen present. At intermediate potentials, both reactions (1) and (2) may occur. Both reactions result in high pH conditions at the electrode (backshell). All of these electrochemical reactions occur on the surface; relative reaction rates vary according to physical conditions, species present at the interface (e.g., oxygenated seawater, water flow rate, and surface morphology).

These reactions are "catalyzed" by electron transfer, in other words, they occur only on surfaces where electrons are available. Reaction rates are limited by electron availability. Electrochemical reaction rate is termed exchange current density ($i_0$). Exchange current densities vary widely for different metal surfaces. As an example, $i_0$ for reaction (1) on copper, nickel, and iron are roughly three to four orders of magnitude higher than $i_0$ for aluminum in similar electrolytes. Backshells are typically 316 stainless steel, Monel, or silicon aluminum bronze. The Monel connectors are chiefly copper and nickel and are accordingly more susceptible to cathodic delamination than many metals. In the case of backshells, selected materials are thought of as more noble and corrosion resistant. Nobel-metal material selection aggravates cathodic delamination since these materials are naturally proficient in electron exchange, thereby promoting galvanic reactions at the metal surface.

Reaction (2) causes a localized rise in hydroxide ions (rise in pH) at the connector/seawater interface that attacks rubber-to-metal adhesive bonds that in turn may create a leak path and subsequent electrical system failure.

In order to eliminate this cathodic delamination problem, glass reinforced epoxy (GRE) and other plastic or nonconductive connectors have been designed and utilized. However, these designs have limited applications since they typically require extensive development efforts for design, procurement and acceptance testing specifications. These types are also limited in some applications by their reduced mechanical strength and greater susceptibility to explosive shock, impact or other risks of random hazard damage typical in the marine environment.

U.S. Pat. No. 4,874,324 relates to connectors having a metal shell that includes a protective plastic coating of polyphenylene sulphide resin that is electro-deposited thereon, and over a portion of which a plastic coating or encapsulating boot is bonded. However, use of the type of organic material described in that patent as part of the metal coating has proved less than satisfactory in laboratory testing conducted for the Naval Research Laboratory's Underwater Sound Reference Detachment and the Naval Weapons Systems Center. During accelerated life testing with applied galvanic potential the material was observed to delaminate itself from the 316 L stainless steel connectors, to which it was applied prior to booting with polyurethane molding compound. Other organic coatings have likewise shown to either delaminate from the metal substrate, or connector backshell, or to suffer adhesive bond degradation with their encapsulating boots during accelerated life testing.

Bray et al. (September, (1993) MTS-93 Conference Proceedings), relates to steel substrates that have a glass and enamel cladding as two particular non-conductive coatings (NCC). Both of these materials were fused at high temperatures in an oven or furnace when applied to a particular substrate after being applied in a wet slurry, or slip. After firing, the materials were slow cooled to prevent breaking or delamination of the glass or enamel from the substrate because of a potential problem of thermal shock with these materials. The application techniques required that the metal substrates be raised to the same temperatures required to melt and fuse the glass or enamel materials. The process required to prepare surfaces with such NCC coatings has therefore in many cases proven to be an expensive, and commercially prohibitive process. In the sense that such treatments require high temperature equilibrium for both the NCC material and the entire device, for treatment of its outer surface, these processes also potentially damage the device, again making such a less desirable alternative.

U.S. Pat. No. 4,714,623 relates to surfaces onto which have been sprayed micronized ceramic, glass or carbon spheres into a wet or uncured resin prior to cure. After cure, the matrix is broken or altered to break into the voids formed by the spherical media giving a very toothy surface for the application of metal cladding. This type of bonding surfaces is reported to result in enhanced bonding.

U.S. Pat. No. 4,913,961 relates to a coating that is resistant to sulfur and ranadium compounds at elevated temperatures. (Scandia is present in the zirconia (a ceramic) between about 4 to about 8 mole percent.) Thermal spray coating is used particularly for the coating of superalloys useful for turbine blades and engine pistons.

U.S. Pat. No. 4,445,989 relates to metallic substrates having a layer of a conductive or ferrite or chromite. The ferrite or chromite layer serves as a sacrificial layer, and is described as having a thickness of at least 8 miles (203.2 mm) for this purpose. U.S. Pat. No. 4,578,114, relates to an aluminum and yttrium oxide thermally sprayed powder blend. The thermal spray of these blends onto metallic substrates is described as providing a coating having high temperature corrosion resistance and tenacity. These preparations include a metal alloy base together with aluminum and yttrium oxide, in amounts described by reference to weight percent of the metal alloy base, i.e., 1 to 15% aluminum and about 0.5% to 10% ytterium oxide by weight of the metal base alloy and other constituents of the composition.

These and other approaches fail to provide an economical and effective approach for inhibiting the breaches that occur between metal surfaces and metal to rubber surfaces. It is an object of the present invention to provide for coatings, methods of coating and coated devices that inhibit cathodic delamination from metal surfaces, such as those common to metal connectors, and to also enhance bond strength between metal and rubber surfaces. It is a further object of the present invention to provide metal devices having improved connector service life, particularly in the field of connectors that are routinely used in a marine environment. It is a further object of the present invention to provide a more economical method of providing a nonconductive coating to a metal surface, without loss in bond strength or significant change in thickness of the surface being treated. It is also an object of the present invention to provide a solution to the problem associated with useful life of currently used underwater electrical connectors having polyurethane, polychloroprene and other polymeric molded boots or coverings.

It is further an object of the present invention to provide improved non-conductive metal coatings that prevent the electrochemical current flow at metal surfaces and essentially halt hydroxide ion production, and thus the damage such electro chemical current flow induces.

Solutions provided by the various aspects by the present invention address long recognized problems currently experienced in many Navy and industrial marine applications, cathodic delamination being the single most important problem currently described in the technology of underwater connectors. A solution to this historic problem at low cost would also serve other long-felt needs in these and many industries where metal surfaces are involved, such as on the tube seals in the tension leg assemblies used for offshore drilling platforms.

SUMMARY OF THE INVENTION

The present invention, in a general and overall sense, concerns metal surfaces with non-conductive metal oxide coatings. The compositions that provide these coatings may be further described as comprising aout 20% to about 99% non-conductive metal oxide or metal nitrides, carbides, borides and florides.

The present invention provides superior metal surface treatment process relative to other metal surface treatment systems tested, particularly where strong and durable rubber-to-and metal-to-metal bonds are needed.

In preferred aspects, the techniques and methods and products of the present invention provide significantly improved service life reliability of underwater rubber-to-metal adhesive bonds. This is accomplished by preventing the common, time-dependent degradation mechanism known as cathodic delamination and in increasing bond strength and durability. The surface treatments, or coatings, provide a nonconductive bonding substrate on the metal to which it is applied. Any metal surface that is at least in part treated so as to include non-conductive, inorganic material will be expected to also have the advantageous properties of enhanced bond strength and durability at metal-polymer interfaces so as to inhibit peeling, or more specifically, cathodic delamination. As is demonstrated in the present disclosure, coated metal-polymer bond strength durability is improved 2 to 5-fold compared to uncoated metal-polymer bonds. Also shown is improved coated metal-polymer-metal bond strength again compared to non-coated metal bond adherence strengths.

In one aspect, the inventive system made use a composite metal oxide powder, these and other forms of the coating may be applied, for example, by thermal or plasma spraying onto a metal substrate. For plasma spray application, the powder is premixed and of a narrow particle size distribution. The coating provides a dense, hard coating that is highly corrosion resistant and has excellent dielectric strength. The surface treatment appearance is rough textured from the deposition process providing increased surface area for subsequent seal coating (if desired) and polymer bonding.

Thickness is controlled so as to be relatively thin in the coating process; a nominal thickness of 0.25/mm (0.010") (10 mils) was determined to be more than adequate and will be reflected in subsequent specifications for this process. Other thickness ranges from about 0.1 mm (0.0039") (3.9 mils) to about 5 mm (0.1969") (200 mils) are considered adequate and useful, selection being a question of the subsequent use of the device. In still other aspects of the invention, the non-conductive metal oxide coating or treatment will have a thickness of about 0.17 mm (3.9 mils) to about 0.2 mm (7.8 mils), or 0.5 mm (0.0197") to about 5 mm (0.1969"), or in still other embodiments, about 1 mm (0.0394") to about 3 mm (0.1181").

It should be noted that in addition to the non-conductive metal oxides described previously, non-conductive metal carbides, metal nitrides, metal borides and metal florides, may also be employed in the coatings. These materials would similarly and preferably comprise between about 20% to about 99%, if not 100% of the composition used to coat the metal surface. Inclusion of metal alloys as a base of a metal oxide composition would be expected to reduce the relative non-conductive character of such surfaces, metal alloys being recognized generally as conductive in character. Thus, in some embodiments, the metal surfaces of the present invention will include a metal oxide coating that comprises less than 50% metal alloy, or less than 40%, 30%, 20% or 10% of the non-conductive metal oxide coating, the non-conductive metal oxide comprising in turn 50%, 60%, 70%, 80%, 90% or even up to about 100% of the metal oxide or other metal nitride, carbide, boride or fluoride of the non-conductive coating.

The devices and methods of the invention may include several, such as 2, 3, 4, 5, 6, or any number desired herein, depending on the particular needs of the artisan in fashioning a non-conductive coating to a metal surface.

In some aspects of the invention, a method for enhancing non-conductivity at a metal surface is provided which comprises applying a non-conductive metal oxide to the metal surface, the metal oxide preferably comprising about 20% to about 99% non-conductive metal oxide. This method may further comprise the steps of grit-blasting the surface and treating the grit-blasted surface with metal particles to provide a metallic bonding surface prior to applying non-conductive metal oxide to the metal surface of the device. In some embodiments, the non-conductive metal oxide is aluminum oxide and titanium oxide. The non-conductive coated surface may them in some embodiments include a polymer coating over the metal oxide coating. In still other embodiments, this polymer coating may be itself coated with an organic resin. Devices prepared according to these various methods are still further aspects of the invention.

The invention also provides a method for enhancing the useful life of a metal surface in a marine environment; the method comprising treating the metal surface with non-conductive metal oxide, the non-conductive metal oxide comprising about 20% to about 99% non-conductive metal oxide. As used in the context of the present invention, the term "non-conductive" metal oxide, is a metal oxide or other material that is non-electron conducting.

In still another aspect, the invention provides a method for inhibiting cathodic delamination between a metal surface and a polymer comprising, prior to providing a polymer over-molding to the metal surface, applying a non-conductive metal oxide coating to the metal surface., This method may further include the steps of first grit-blasting the metal surface, to provide a metallic bond surface, before applying the metal oxide coating material. Again, the method may further include applying an organic resin seal over the polymer.

Sealants

In some embodiments, the treated surface is also processed to include a sealant film, or coating. The seal coat used was a phenolic extended by a reactive diluent and allowed to wick into surface pores formed after the deposition process. By way of example, such organic resins include phenolic resins and, epoxy, acrylic, phenolic, vinyl esters, polyester, polyurethane, and silicone based resins. While any sealant may be used, those employed in some aspects of the invention is a phenolic resin sealant, particularly Sulzer Metco, Catalog No. AP (Westberry, N.Y.). Other sealers that may be used in the practice of the present invention include coracone (silicone based sealant), and other sealers with high dielectric properties.

Metal Oxide Coatings

A representative list of metal oxides that may be used include:

- 82% Zirconate (range 75–82%)
- 99.8% Ytteria
- 12% chrome oxide- 5% silica- 33% tetania
- 100% Alumina and titania ranging from 1 to 99% titania with from about 1 to 99% Alumina
- 88.33% zirconium oxide+7.25% yttrium oxide+4.2% other oxides
- 95.89% chromium oxide+3.79% silicon oxide+0.13% aluminum oxide
- 99.59% aluminum oxide+0.03% iron oxide+36% other oxides
- 92% chromium dioxide+5% silicon dioxide+3% titanium dioxide
- 98% aluminum oxide+0.5% silicon dioxide+1.5% phenolic sealant (#109)
- 60% aluminum oxide+10% titanium oxide and other oxides 30%

87% aluminum oxide+13% titanium oxide

97% aluminum oxide+3% titanium oxide

8% Yttrium and 92% zirconium oxide

72% $Al_1O_3$28% MgO

30% 30% CaO 70% $ZO_2$

95% chrome oxide-5% $SiO_2$

98% chrome oxide+2% other oxides

97% $Cr_2O_3$+3% $TiO_2$ chrome titania

80–92% zirconium oxide between about 8% and 20% Ytteria

Of course, the above list is exemplary only, and many other specific combinations of similar yet non-conductive metal oxides, nitrides, borides, carbindes, and florides may be employed to provide the non-conductive coatings and metal surface treatments of the present invention. These metal oxides do not include conductive metal oxides, such as ferrite or chromite in an amount that would compromise the non-coinductive character of the presently described non-conductive coated metal surfaces. It is anticipated that metal surfaces coated with metal oxide compositions that include at least about 20% non-conductive metal oxide may be used in conjunction with the invention to provide a non-conductive layer to the surface. Coatings or coating compositions that include about 20% non-conductive metal oxide, or between 20 to about 100% nonconductive metal oxide, or 50% to about 100% metal oxide, or 75%, or 90% to about 100% non-conductive metal oxide, however, may be used. In some aspects of the invention, a bond coat is used. This bond coat in some embodiments is 316L stainless, monel 402 or silicon-aluminum bronze. The bond coat is provided to enhance the surface porosity of the metal to be treated with the described non-conductive metal oxide coatings of the invention. The processes and devices of the invention in some embodiments do not include a bond coat, while others do. The present inventors have found that surfaces treated with the metal oxide alone, without an initial bond coat, will also provide an enhancement of bond strength between metal surfaces.

As used in the description of the present invention, the term "grit-blasting" is defined as abrading a surface with high velocity, such as with compressed air, that includes particulate material, such as aluminum, sand, etc. Acid etching may be used as well to accomplish a roughened surface to the metal. The spraying is in all respects effected in the conventional manner previously utilized for self-bonding thermal spray material, and in particular metal or composites. Due to the self-bonding characteristics, special surface preparation other than good cleaning is not required, though, of course, conventional surface preparation such as grit blasting should be utilized to maximize tenacity of the coating to the substrate surface.

Typical applications of the present methods and processes for terating devices with metal surfaces include energy conversion devices: automotive and diesel combustion and turbine engines; aircraft and marine turbines; coal, oil, and fossil fueled boilers and power generation systems and components: metal coatings, and pulp and paper mill applications.

The following examples are given by way of illustration and not limitation. Alternatively, other methods, such as acid etching and the like (such as wire brush, "sand paper", base treatment) may be used to accomplish an abraded surface to a metal and be equally as useful in the practice of the invention as grit blasting. The additional oxides that are included in some embodiments of the coatings and methods may each contain small amounts of alloying elements, but preferably each is in substantially pure form; for example, they should contain less than 5 and preferably less than about 2 percent impurities. Moreover, alloying elements should be minimized so as to not compromise the substantially non-conductive nature of the metal oxide coatings to the metal surface.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

Non-hatched surface indicates metal surfaces having standard surface preparation (Standard=PR 420 primer; polyurethane strips were used in peel test)

Figure 7:
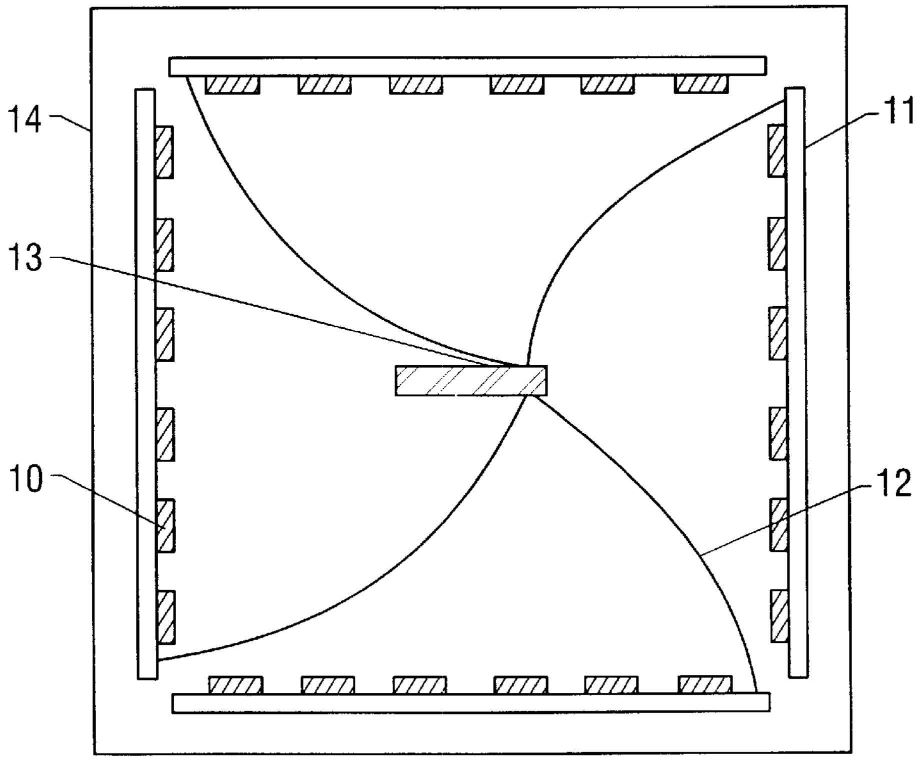

FIG. 7. Schematic of Plate Arrangement in Saltwater Tanks; 10=peel strips; 11=plate (cathode); 12=wire connection; 13=zinc anode; 14=tank FIG. 8. Coupon Test Data; Plot of Peel Data; standard surface treatment (control)=-¤-; $Cr_2O_3$=+; $Al_2O_3$-White (inorganic)=-○-; $Al_2O_3$ $TiO_2$ (inorganic)=-Δ-

Figure 9:
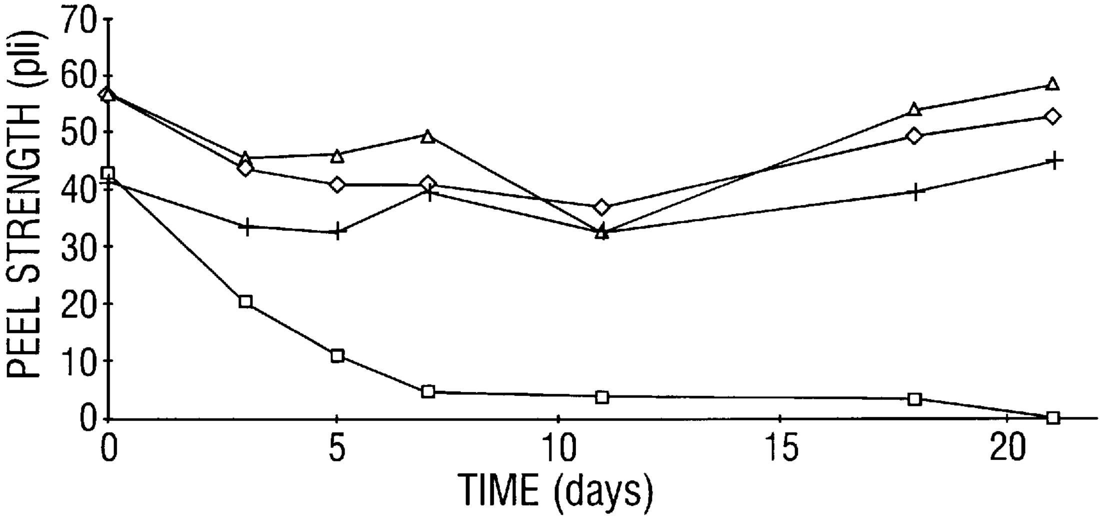

FIG. 9. Coupon Test Data; Plot of Peel Data; standard surface treatment (control)=-¤-; $Al_2O_3$ (inorganic)=+; $Cr_2O_3$ (inorganic)=-◇-; $Cr_2O_3$=$Al^2O^3$=-Δ-

Figure 10:
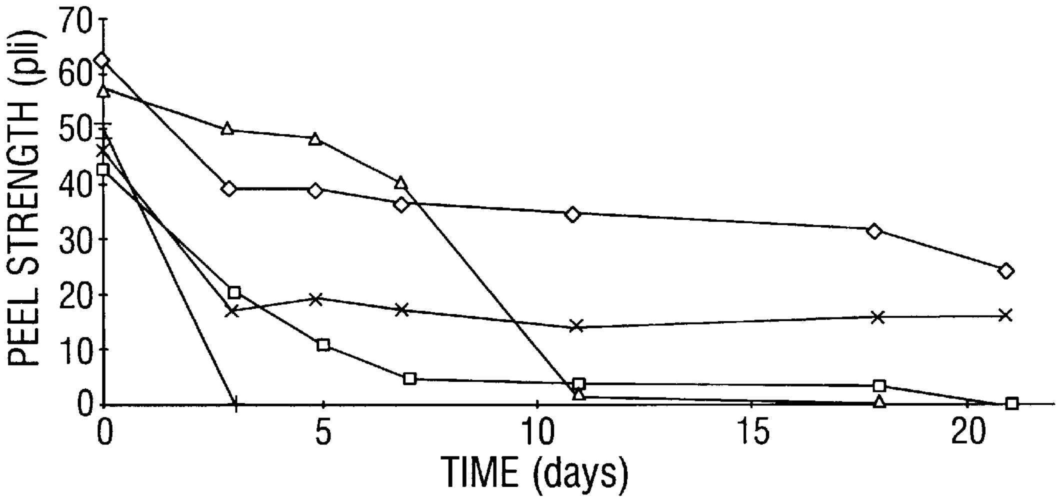

FIG. 10. Coupon Test Data; Plot of Peel Data; standard surface treatment (control)=-¤-; $ZrO_2/O_2$ (inorganic)=+; $Al^2O^3$-Gray (inorganic)=-◇-; $Al_2O_3$ $TiO_2$ (inorganic)=-Δ-; $Cr_2O_3$ (inorganic)=-x-

Figure 11:
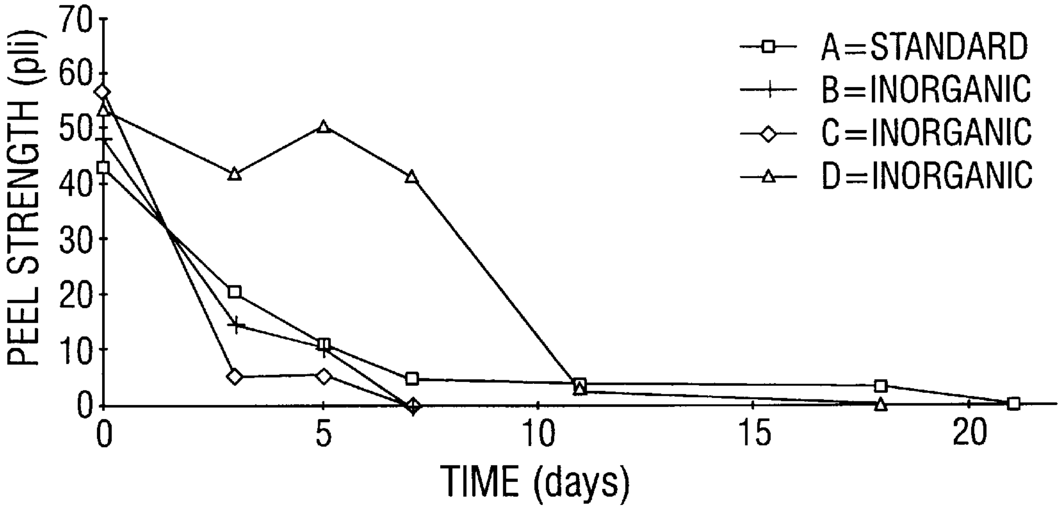

FIG. 11. Coupon Test Data; Plot of Peel Data; standard surface treatment (control)=-¤-; $Cr_2O_3$ (inorganic)=+; $Al_2O_3$-White (inorganic)=-◇-; $Al_2O_3/TiO_2$ (inorganic)=-Δ-

Figure 12:
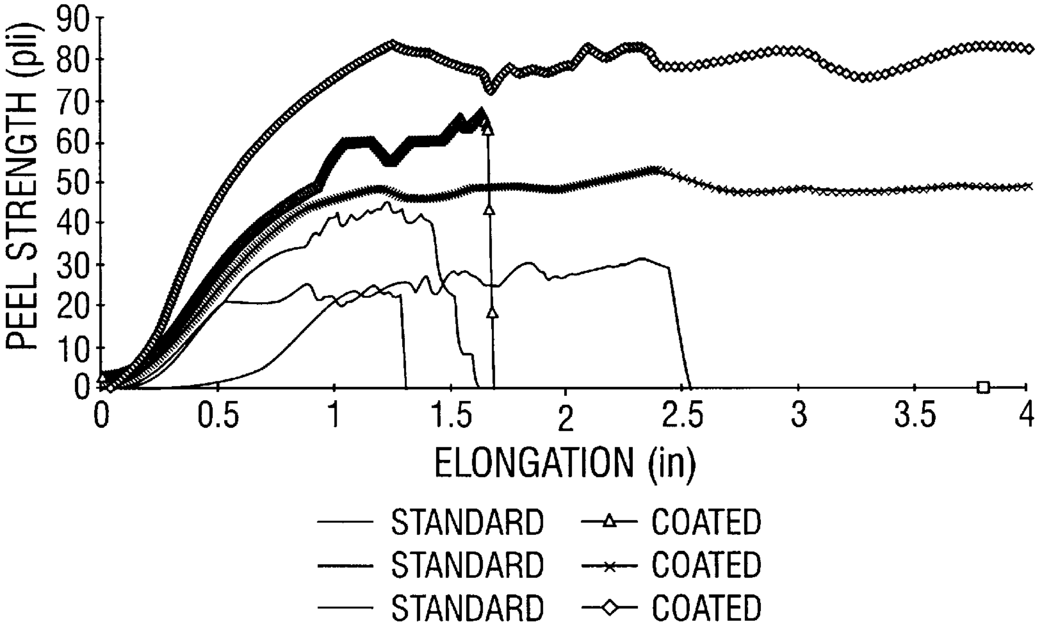

FIG. 12. Peel Data for Baseline Peel Specimens; Standard (control)=–; $Al_2O_3$-White coated=-Δ-; $Cr_2O_3$ (coated)=-x-; $Al_2O_3/TiO_2$ (coated)=-Δ-

Figure 13:
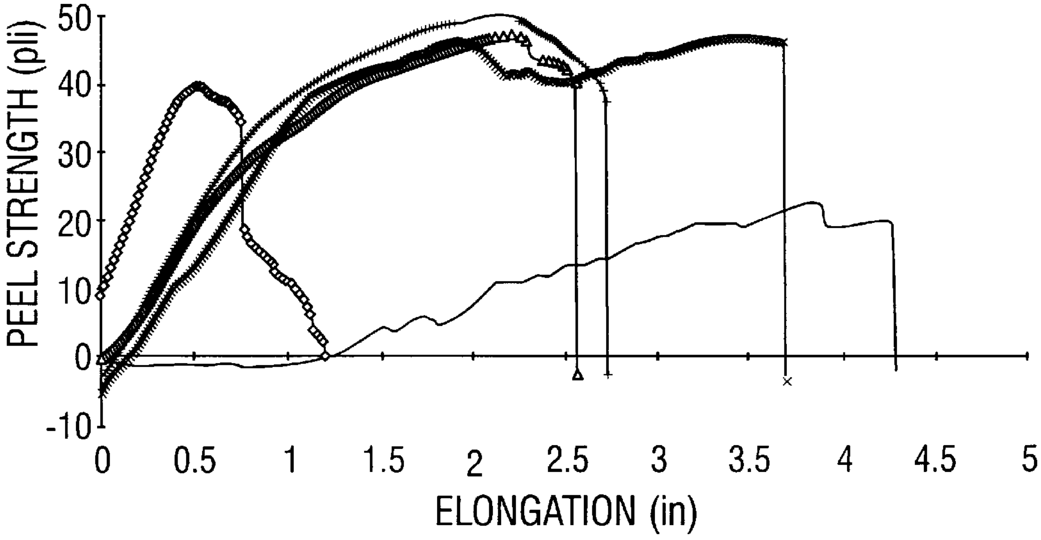

FIG. 13. Actual Peel test data of 5 EY ALT test specimens (full article).

Figure 14:
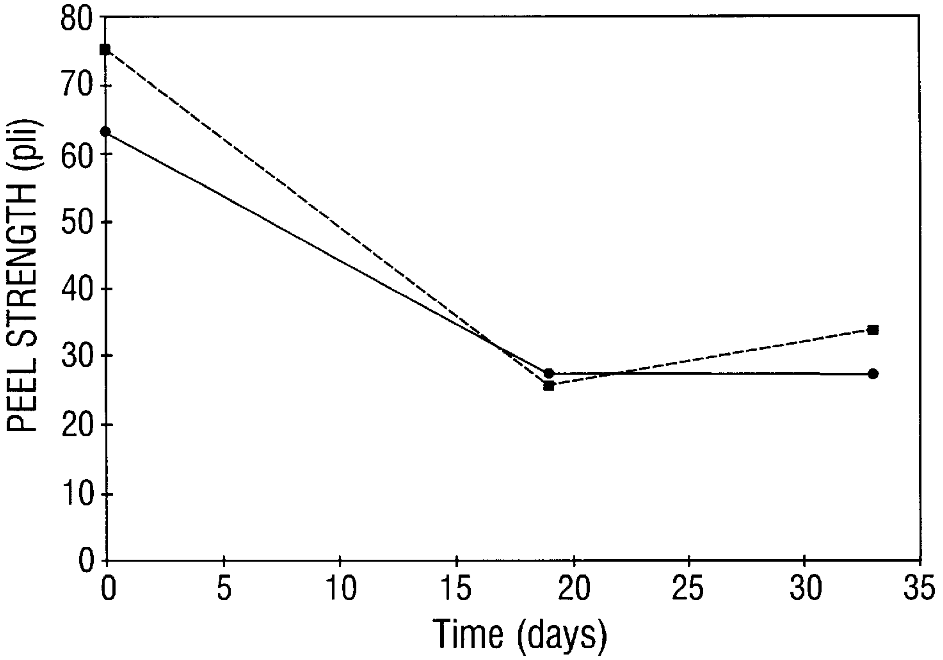

FIG. 14. Accelerated Life Test (ALT) of metal surfaces with a phenolic resin sealer over the metal oxide 6 at (aluminum oxide+titanium dioxide blend) (—■—) and metal surface without a phenolic resin sealer over the metal oxide coat (—574 —).

Figure 15:
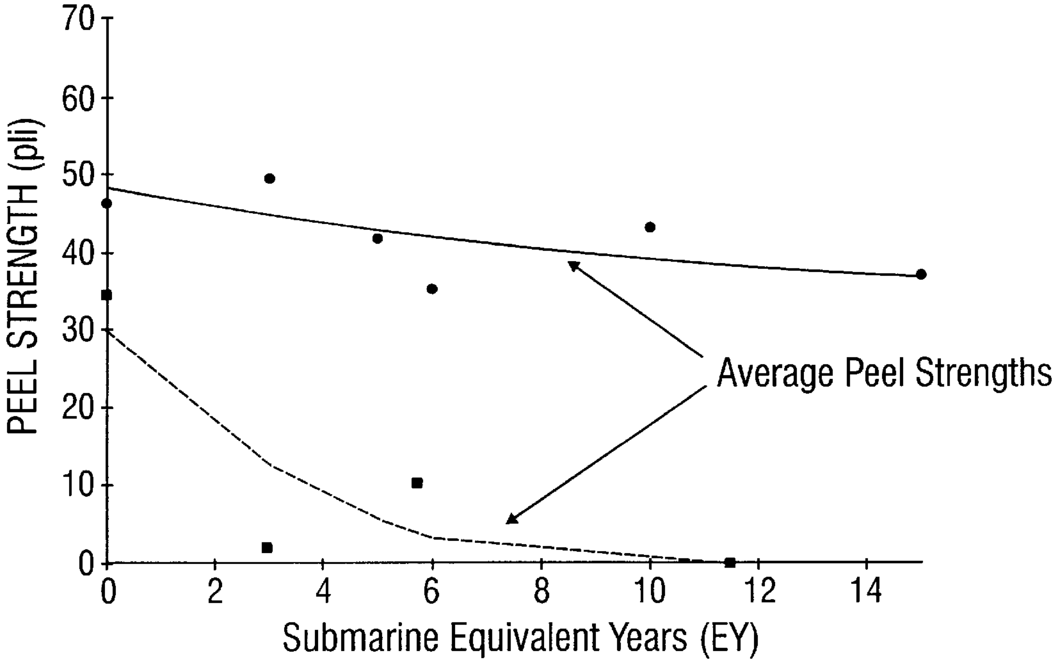

FIG. 15. NCC Peel Data Full Electrical Submarine Connector ALT ($14^{+}$Submarine Equivalent Years (EY) vs. Peel Strength Durability). ●=NCC Bond of nonconductive inorganic metal oxide coat (aluminum oxide and titanium dioxide) with stainless steel bond coat under polyurethane boot). ■=Standard Bond (no stainless steel bond coat, does include an epoxy layer between ceramic substrate and polyurethane boot).

Figure 16:
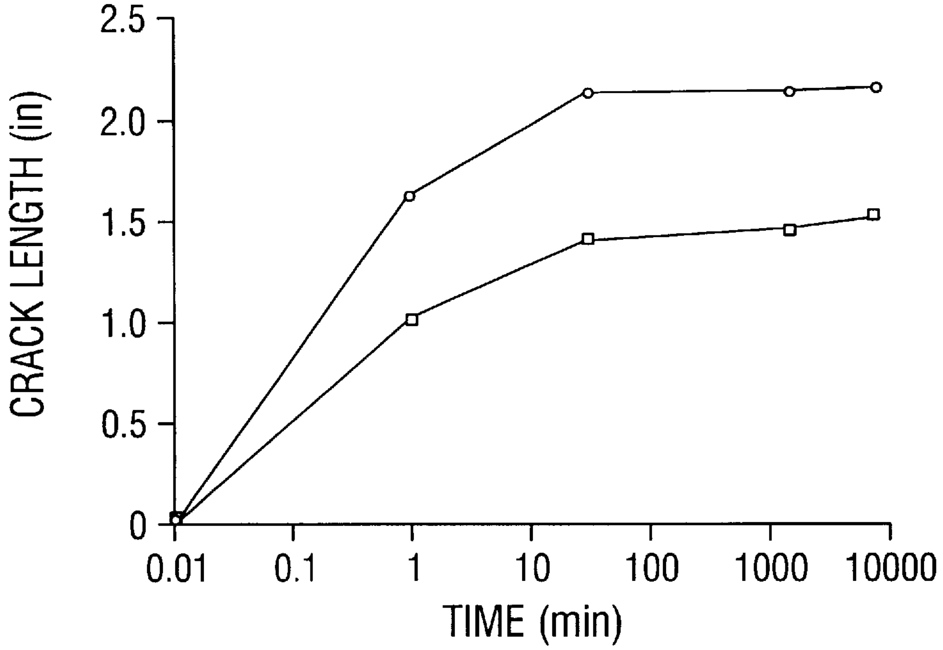

FIG. 16. Wedge Test Data (crack length (inches) v. Time (minutes) Metal to metal bond strength (grit-blasted (—○—); ceramic surface (—¤—) treatment).

Figure 17:
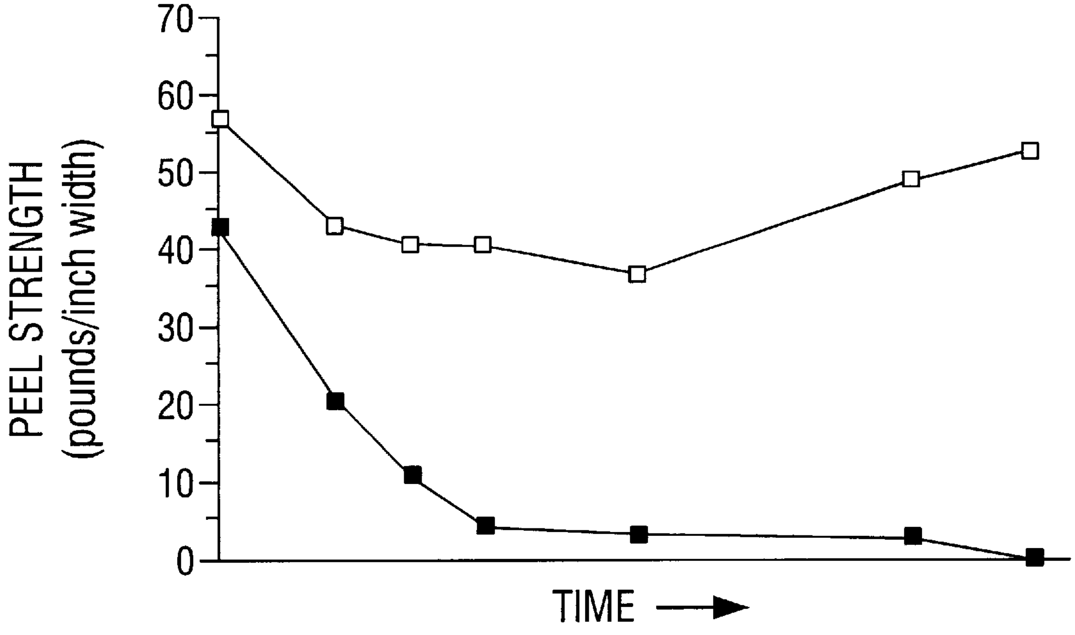

FIG. 17. Plot of peel data. Bond delamination=-¤-; cohesive failures only=-■-.

Figure 18:
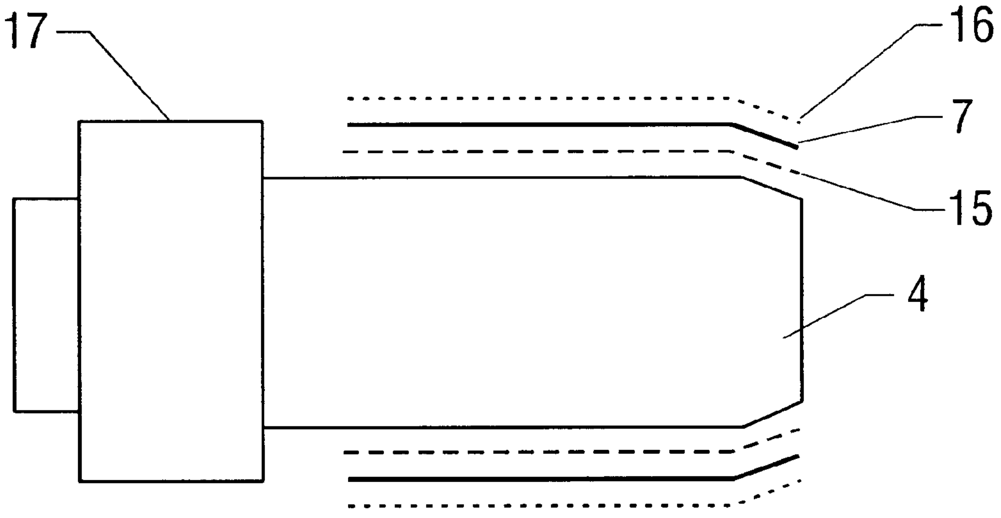

FIG. 18. A schematic of the different layers to a plasma applied coating of a generic backshell; 4=metal surface; 7=metal oxide coat; 15=metal bond layer; 16=seal coat layer; 17=metal backshell.

DETAILED DESCRIPTION OF THE PREFERRED EMBODIMENTS

Numerous non-conductive coating systems were tried (See Table 1). Many performed better than standard rubber-to-metal bonds (where the metal surface is not treated with a non-conductive metal oxide). The described non-conductive metal oxide coated metal surfaces were found to be superior based on bond performance (peel strength and durability), environmental compliance, cost, procedural simplicity, and other applicable criteria.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the composition, methods and in the steps or in the sequence of steps of the method described herein without departing from the concept, spirit and scope of the invention. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the invention as defined by the appended claims. The following data reveals the outcome of analytical investigations on the non-conductive coating systems examined.

EXAMPLE 1

Non-Conductive Coating Systems

Three major types of coating systems are discussed in the present example that may be used in the practice of the present invention. These are: thermal spray, epoxy, and porcelain coating systems. Thermal coating systems are divided into two major categories plasma coating systems and high velocity oxyfuel (HVOF) systems. The epoxy coating systems are divided into coal-tar and aromatic oil-extended.

Thermal Spray Coatings

A thermal spray system is described generally in U.S. Pat. No. 4,578,114, which reference is specifically incorporated herein by reference for this purpose. Thermal spraying (plasma, wire arc, HVOF, detonation gun, etc.) are processes for applying coatings of high-performance refractory materials—metals, ceramics, cements, carbides, etc.—to relatively easy-to-work and/or more economical substrate materials; in this case a stainless steel connector backshell. Powder or wire made from coating material is fed into an electrically or combustion heated "gun" where it melts. A carrier gas, such as argon, nitrogen, combustion gases, or compressed air, accelerates tiny particles 10 to 50 $\mu$(0.0004 to 0.0020 inch) of molten material towards the part to be coated. Particle velocities are typically low multiples of the speed of sound, i.e., Mach 1 to Mach 3. Particles impact, imbed, cool, and bond to the substrate. The coating consists of bonded particles of various shapes, particle size distributions, and degrees of melting that depends on the materials and technique employed. Thickness may be controlled by the application rate and number of passes. The process may impart morphological surface properties otherwise unobtainable in native substrate materials.

Figure 1A:
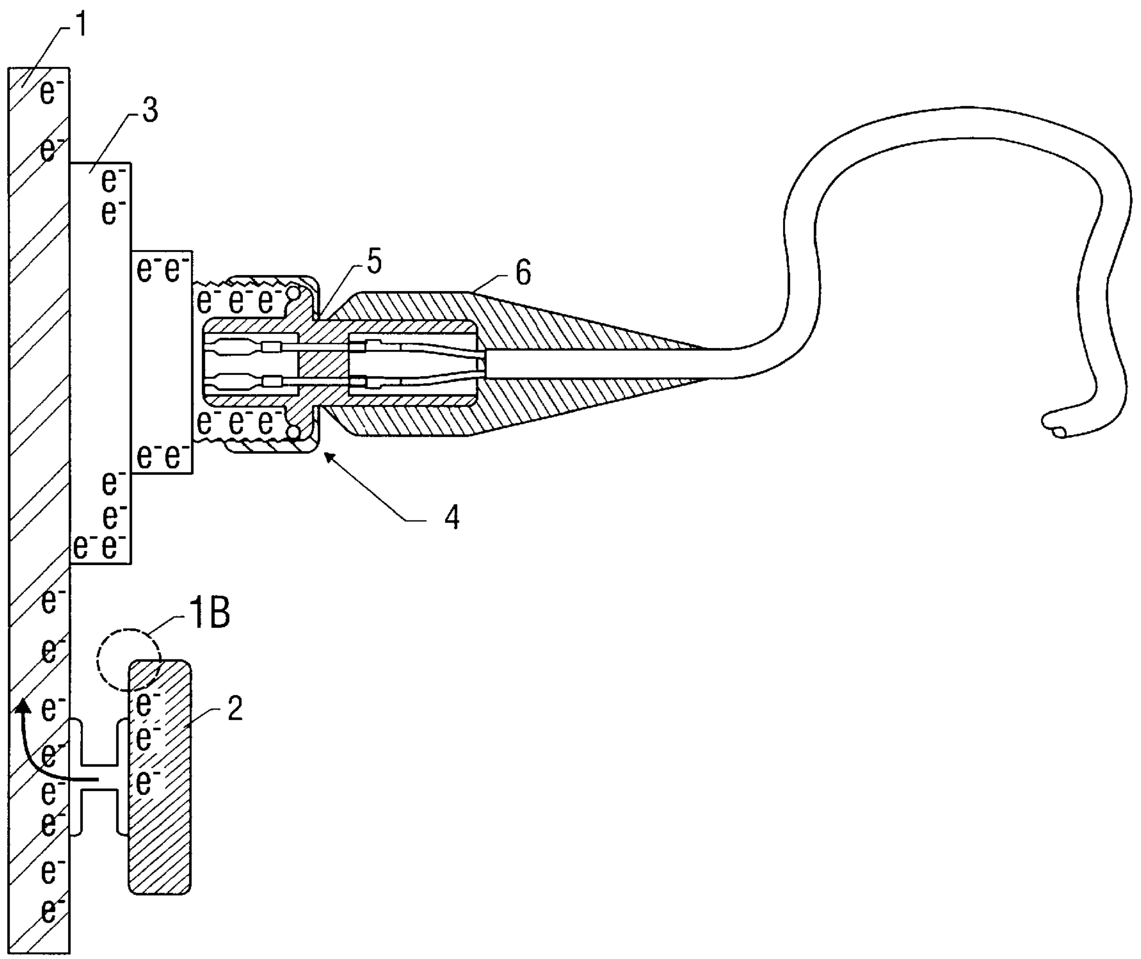
FIG. 1A and FIG. 1B. Schematic of Galvanic Corrosion. Diagram shows electrical connector coupled to hull (cathode), and flow of electrons from anode 2 to cathode 5. Electrons circulate through connector/cathode to maintain charge balance. 1=ships hull; 2=zinc anode; 3=substrate surface; 4=metal surface; 5=cathode; 6=rubber boot.
Figure 1B:
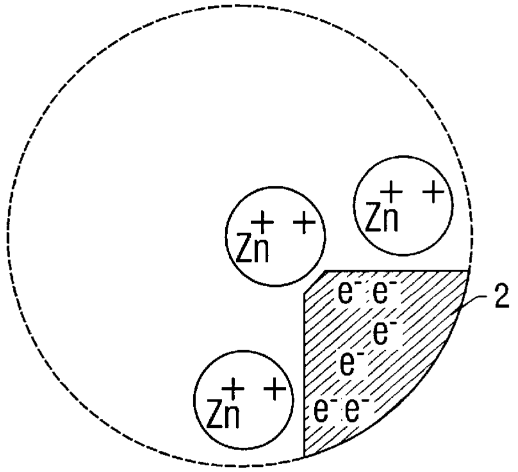
Figure 2:
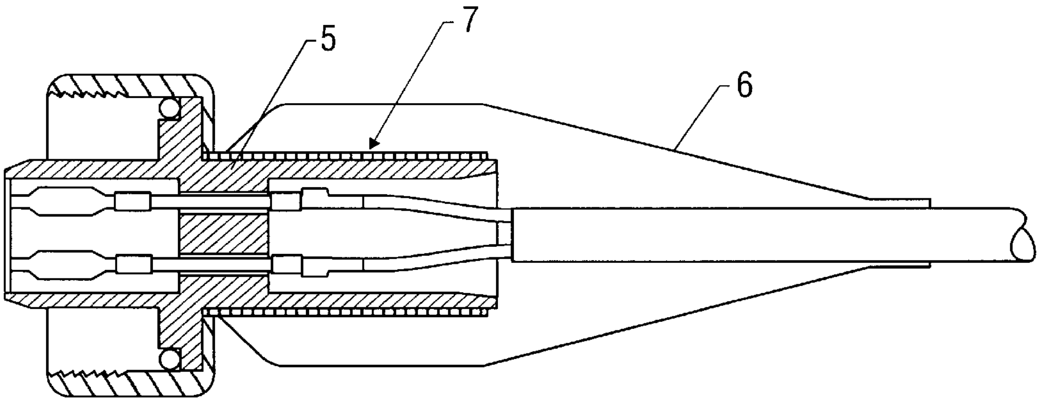
FIG. 2. Connector Schematic; 5=cathode; 6=rubber boot; 7=non-conductive coating of metal oxide.
Figure 3:
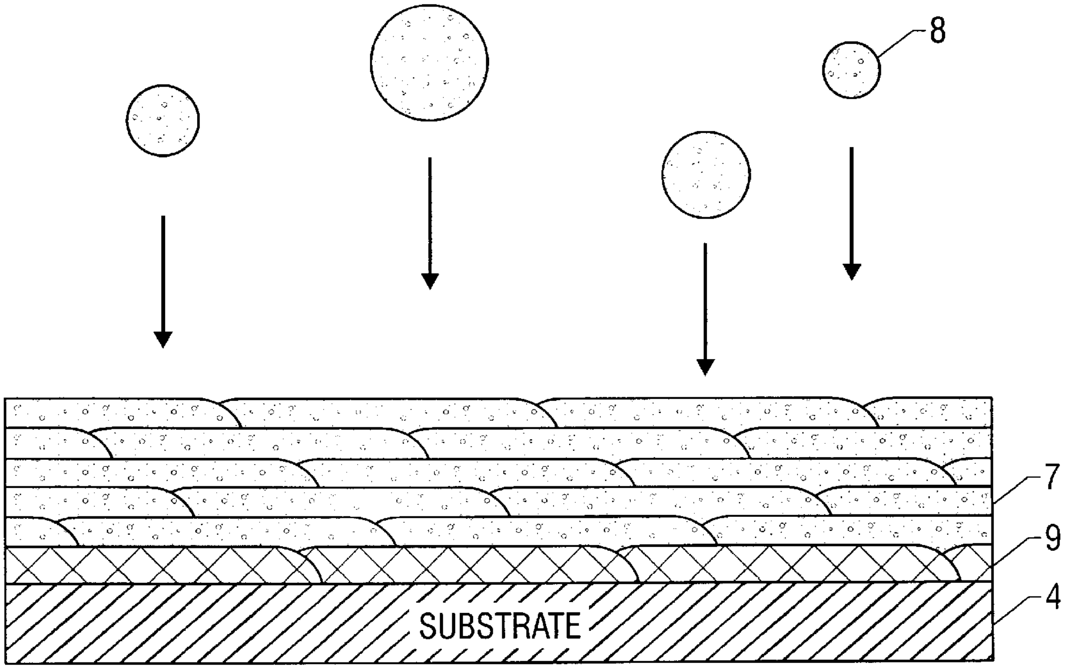
FIG. 3. Plasma Coating Deposition Process; 4=metal substrate; 8=metal oxide particle (10–50 $\mu\Phi$); 9=metallic bond coat; 7=non-conductive coating.

Two thermal spray technologies were employed, depending on the makeup of the coating applied to the substrate. These were plasma spray and high-velocity oxyfuel (HVOF). While each thermal spray technique provides unique surface features, deposition rates, and operating character, there is a basic similarity in application; the material is molten and imbeds into the surface. (See FIG. 3.) A molten particle suspended in hot gas or plasma is carried along at supersonic velocity and deforms into a very thin "pancake" of material as it solidifies. The coating builds up to the desired thickness in a manner governed by deposition rate and gun movement. The layering process may have small voids between the "pancakes" that effect coating density. A seal coat may be applied to the surface as a final protective finish to fill such voids in some embodiments of the invention, but are not required.

A very thin bond coat of the native substrate material may be applied prior to the coating to provide a suitable transition from substrate to coating. Thermal spray coatings investigated in this example had a bond undercoat of material identical to the substrate, e.g., stainless backshells get a thin coat of stainless steel, Monel backshells get a thin coat of Monel, and so on. These bond coat materials are further defined as 316L SS, Monel-400, and Silicon aluminum bronze, and so on.

Plasma Spray Coating

The predominant thermal spray coatings investigated were plasma coatings. Plasma is produced by generating an electric arc between electrodes and directing gas (nominally 4.2 $m^3$/hour or 150 cfm) through the arc. The gas may be air, helium, or argon. Atoms that pass through the arc are excited and stripped of electrons. The resulting gaseous stream is an ionized gas consisting of ionic species (atoms without their full complement of electrons) and free electrons. Plasma is electrically conductive and influenced by magnetic fields such that the plasma may be contained and "focused". Depending on the degree of ionization, the temperature may reach tens of thousands of degrees Celsius.

Plasma guns typically have a tungsten cathode centered within a funnel-shaped copper anode. A secondary or transfer arc may also be imposed between gun and substrate to preheat or sputter clean the surface to be coated. Some coating operations may be in a partial vacuum, but atmospheric pressure is typical. Either powder or wire feedstocks may be used. Deposition rates are in the range of 0.1 kg/hr (0.2 lb/hr).

HVOF Spray Coating

Certain coatings examined were laid down by high-velocity oxyfuel (HVOF) thermal spray technique. In HVOF, a fuel gas and oxygen are used to create a combustion flame of 2,500 to 3,100° C. (4,500 to 5,6000). Combustion occurs at a very high chamber pressure, exiting through an orifice-like barrel to create a supersonic gas stream and very high particle velocities. The process results in extremely dense, well-bonded coatings. Either powder or wire feedstocks may be used. Deposition rates are in the range of 2.3 to 14 kg/hr (5 to 30 lb/hr). The gaseous impingement environment is $N_2$, $CO_2$, $H_2O$, and CO.

Epoxy-Based Formulations

Two epoxy-based coatings were developed to apply to backshells prior to rubber booting. These two systems are further described below. Each made use of Shell Epon 828 (Shell Oil Corp, Houston, Texas) and diethylenetriamine (DETA) as the base resin and curing agent, respectively. Curing agent ratio was 12 percent DETA by weight in Shell 828, according to the specified resin chemistry. To this resin system, a quantity of an additive, such as coal tar or aromatic oil (10% by weight) was mixed. The resulting viscous fluid was applied by dip coating or brush to a thickness of 0.020" (0.5 mm) and tested according to protocol by the present inventors using ASTM D/413-82 (peel test).

1. Coal-Tar Epoxy System

Coal-tar is derived from the substochiometric pyrolysis of coal. Oils and tars driven off may be collected as a viscous-to-gummy dark fluid. It has application as a corrosion protection coating in paints and sealants. Blended with epoxy and allowed to cure, it forms a dark hard material with good dielectric properties, resistance to water, and reasonable impact and tensile properties. Bond performance was quite good with this system. However, the material presented application-associated problems.

2. Aromatic-Oil Epoxy System

Like the coal-tar system, the aromatic-oil system makes use of Shell 828 and DETA as the base resin and adds 10% highly aromatic oil. The oil's aromatic content was nominally 80%. Color was dark amber to brown. Bond performance was also very good.

Both the coal-tar and aromatic-oil systems suffer from environmental problems associated with an amine curing agent (DETA). Moreover, there may be other toxicity links in these systems. Therefore, based on environmental compliance and brittleness issues, these two non-conductive coating systems are less preferred in some embodiments of the invention.

EXAMPLE 2

Comparison of Metal vs Porcelain Enamel Metal Oxide Coated System

The present example is provided to demonstrate the inorganic glass coating system which was used for comparative purposes in the present invention.

Porcelain may be applied as a protective and/or decorative coating to metallic surfaces, fired-clay, and stone. A common example is household appliances. Porcelain-enamels come in an extremely wide variety of formulations, although they are not paints as such, as the name "enamel" may imply. Porcelain is a ceramic.

Samples were prepared for peel testing using two porcelain formulations manufactured by Miles' Industrial Chemicals Division. The material was delivered as a powder and mixed with water in a high-shear mixer and aged overnight to allow clay to slake. The substrate plates were prepared by cleaning the surface with organic solvent and grit blasting with steel grit. The substrate was brush coated to a wet film thickness of approximately 0.014 to 0.018 inches (0.36–0.46 mm) to achieve a fired thickness of 0.007 to 0.009 inches (0.18–0.23 mm) at a specific gravity of 1.8 to 1.84. Plates were dried in a 300° F. oven for two hours. Final firing was as follows:

Sample 93-R-1930 15 min. @1,560° F.

Sample SE-2493 20 min. @1,500° F.

Bond performances between porcelain and rubber were better than for standard rubber-to-metal bonds. They were, however, not as good as bonds with thermal spray coated surfaces with metal oxides, such as titanium oxide and aluminum oxide. Also, there were several problems associated with porcelain processing.

The high-heat environment necessary to melt and fuse porcelain, oxidized and discolored the metallic surface to dark-brown. When a shiny metallic surface is desired, this process produces an unsightly and undesirable product. Attempts to combat the discoloration problem included firing in an oxygen-free (argon) environment and protective coatings (powdered carbon and others) during firing. Discoloration of the metallic substrate was improved. In addition, the oxygen-free environment results in a weaker bond to metallic surface due to elimination of the oxide coating. Blistering of the porcelain coating on Portsmouth connections (Monel substrate, a steel surface) was also observed. Lastly, the porcelain coating proved to be very brittle and prone to chipping. Because of these observed problems, porcelain non-conductive coating is less preferred compared to metal surfaces that include metal oxide coatings. The inclusion of metal oxide in a ceramic coating material itself may also enhance the bond strength at metal-metal and metal polymer interfaces.

EXAMPLE 3

Accelerated Life Testing

The present example is provided to demonstrate the over 2-fold enhancement of useful life provided to devices whose surfaces have been treated according to the invention, over currently used state-of-the-art techniques.

Accelerated life testing (ALT) is a means by which the aging processes of a piece of material, equipment, or hardware can be speeded up in the laboratory by elevating the stresses to which the item is normally subjected. Performance data can be collected in an ALT much more quickly than would be possible in normal aging. Consequently, lifetime reliability predictions can be made very efficiently using ALT techniques.

Aging that occurs due to chemical processes can be accelerated through elevated temperature exposures. The acceleration rate achieved at various temperatures also depends on the activation energy ($\Delta H^*$) of the chemical process of interest. The equation describing the relationship between these parameters is the Arrhenius Relation:

$$t = Ae^{(H^*/RT)} \quad (6)$$

where t is the time required for a particular event to occur, A is a process-dependent constant, R is Boltzmann's constant, and T is the absolute temperature (degrees Kelvin) of the process.

The event in question may be defined to suit the intent of the process being studied; for example, the event of interest may be the point at which a sample under tensile stress elongates 10%, or it may be the point at which a metal bar fails in a fatigue test. In the case of underwater electrical connectors, the "event" is not so simply defined as a discrete failure episode. A rubber-to-metal bond that appears normal in every respect may be weakened and unserviceable. Even before delamination occurs on its own, rubber-to-metal bond strength may be critically compromised and routine handling may lead to connector flooding. Thus peel strength (as a function of time) becomes the parameter of interest in ALT of molded connectors.

The particular ALT protocol used in the present structures is outlined in the attached document labeled as Appendix A.

EXAMPLE 4

Coupon Test Setup

The present example is provided to demonstrate the enhanced resistance to polymer, particularly polyurethane, peeling, from a metal surface provided by inclusion of a non-conductive coating, such as non-conductive metal oxides, to a metal surface prior to treatment or overmolding with a polymer.

Figure 6A:
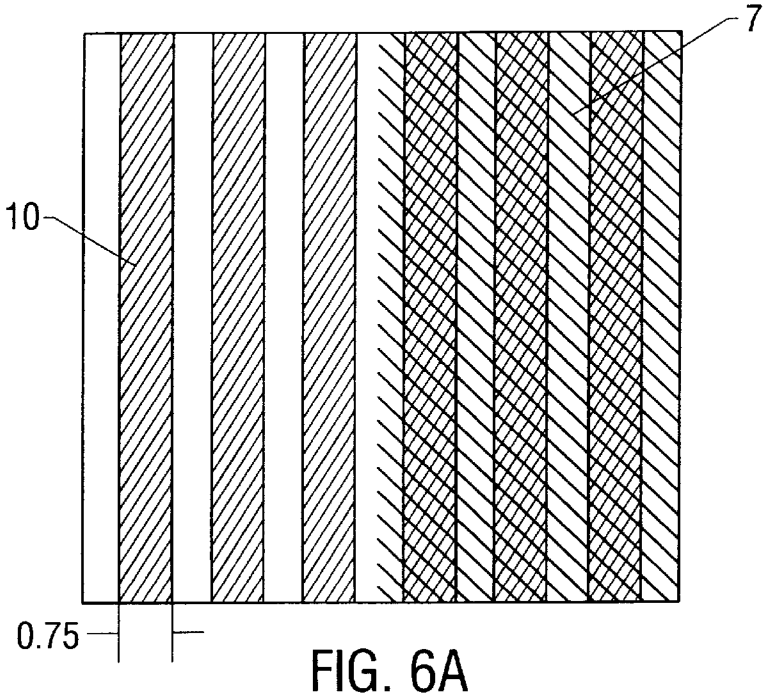
FIG. 6A and 6B. Schematic of Coupon Test Plate (Half Non-Coated, Half Coated) 9×9 non-conductive coating test coupon for ASTM D413-82 peel testing. Double-hatched area indicates plate surface that was coated with an aluminum oxide/titanium oxide treatment over the urethane peel strips.
Figure 6B:
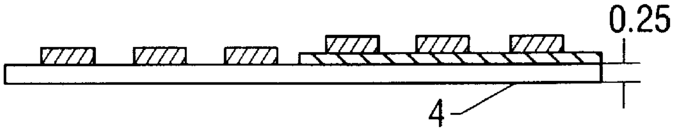

Plates with urethane strips for peel tests were prepared as follows (see FIG. 6):

1. Plates were prepared for coating by grit blasting, plasma coating, or other methods as appropriate for the non-conductive coating applied.
2. The non-bonded areas of the plates were marked and taped off.
3. A one inch tall dam was prepared around the perimeter of the plate.
4. The PR-420 primer was applied on the plate surface to be bonded and allowed to dry.
5. Degassed urethane (PR-1547) was cast to a thickness of approximately 0.250 inches.
6. The plate was allowed to cure one day at room temperature before undergoing postcure at 180° F. for 24 hours.
7. The non-bonded areas were excised from the plate after postcure.

Prepared plates were arranged in salt water tanks. The specimen plates (cathodes) were vertically positioned adjacent to the tank walls, as in FIG. 7. The plates were electrically connected to an electrode grade zinc anode (IAW MIL-A-18001G) to stimulate galvanic corrosion protection and associated electrochemical reactions as on a ship. The temperature in the tanks was maintained at 150° F. (70° C.) to accelerate the test time. (See ALT discussion.) Tanks were monitored for salinity and temperature. Plates (standard and coated) were removed every 2 to 3 days and peel tests were conducted on a series 4500 Instron tensile testing machine in similar fashion as with ASTM method D-143-82.

All plates were solvent washed prior to priming and urethane casting. Ethanol was used as the solvent of choice.

All plates were grit blasted prior to priming. Epoxy-based formulations were primed after post-curing the epoxy in preparation for urethane strips. Thermal spray coatings received a primer coat prior to casting urethane strips. All plates were post-cured in accordance with molding specifications for AN/WLR-9 connectors. Urethane strips were of a uniform thickness to prevent data scatter imparted by cohesive property variation as a function of thickness irregularity.

It is often necessary to determine the activation energy of the process of interest. This may be accomplished by performing tests at three different temperatures and determining the corresponding times required to achieve the event of interest. Taking the log of both sides of Equation 6 yields:

$$In(t)=Ln(A)+\Delta H^*/RT \quad (7)$$

Plotting In(t) vs. I/T should result in a line with slope DH*/R.

Since delamination of the rubber-to-metal bond is beyond the point of being acceptable or serviceable, the self-induced delamination end point is not of interest. Thus a set of failure tests at multiple temperatures to see when the boot material flaked off of its own accord was not pursued. Tests were also completed to determine the activation energy for diffusion of water into urethane rubber. A value of 0.6 eV (13.3 kcal/mole) was determined for urethane rubber. (Note that this value depends on rubber type.) Knowledge of the activation energy of the process allows characterization of the amount of acceleration provided as a function of the elevated temperature. From Equation (6) it is clear that elevating the temperature of a process will decrease the time required to achieve the event of interest. The ratio of time required to achieve the event at nominal temperature to the time required at elevated temperature is defined as the acceleration factor. If the nominal and elevated temperatures of the process are (respectively) $T_o$ and $T_e$, then the acceleration factor (AF) may be expressed as $$AF=\text{¶}[(\Delta H^*/R)(I/To-I/Te)] \quad (8)$$

Appropriate selection of elevated temperature will then provide the level of acceleration required for the test.

Coupon Test Results

The following plots (FIGS. 8–11) represent peel strength tests conducted on coupons having a non-conductive coating applied prior to casting in place a polyurethane peel strip. (See FIG. 6A and 6B.) A key to plots is presented in Table 1. Note that coating A represents the standard (noncoated) configuration having only the standard organic primer (Courtaulds Aerospace PR-420) applied prior to PR-1547 polyurethane molding compound. This is the primary system currently in use fleet wide.

EXAMPLE 5

Coupon Tests

Coupon tests were developed as a means of testing a variety of coatings for environmental durability as compared to non-coated specimens. The results from testing and factors such as cost and applicability was used to determine which coating was used in full article tests.

All coatings appeared to have adequate to excellent dielectric properties. Each coating effectively isolated the substrate metal from an electrical path through the coating. Some coatings degraded in ALT and had lower insulation resistance after exposure.

Each of the peel strength plots has several curves; the standard noncoated performance curve (A) appears on each plot. Other curves represents peel strength versus time for various coated plates. As seen on each of the plots, the standard (A) degraded severely after six days in ALT to an unacceptable level. This confirms observed degradation in fleet service.

Figure 8:
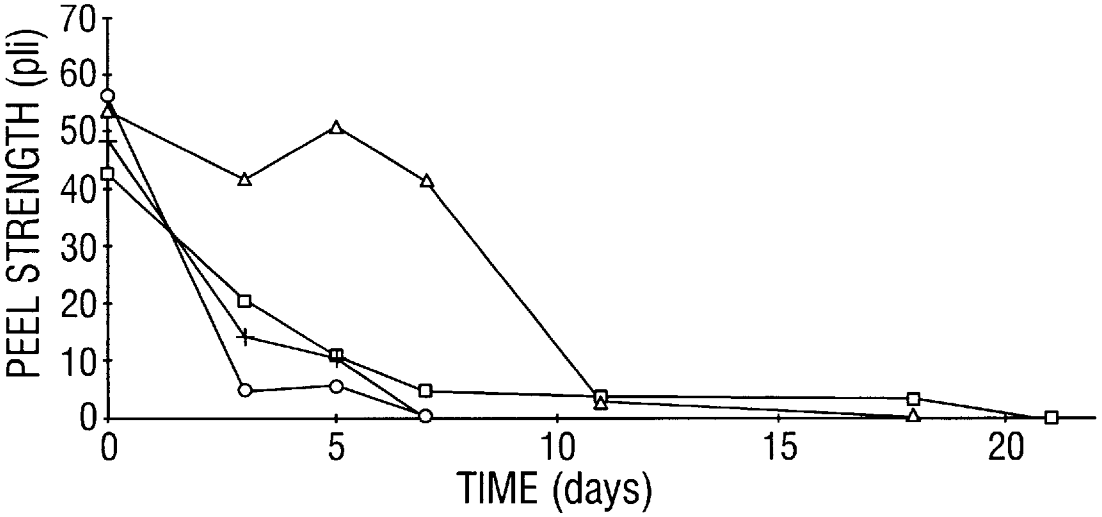

FIG. 8 shows curves for coal-tar epoxy (L), aromatic-oil epoxy (M), and two alumina-titania plasma sprayed coatings. All of these non-conductive coatings performed well in ALT.

The epoxy-based formulations performed quite well. Bond strength improved after an initial degradation. Covalent bonding might explain the bond-enhancement phenomena. Urethanes, including Courtaulds Aerospace PR-1547, typically have a slight stoichiometric excess of isocyanate groups (from toluene diisocyanate in this case) present as unreacted chain terminations after the cure is completed. Similarly, epoxy formulations typically have unreacted oxione chain terminations available. An isocyanate may react with moisture (bound to the epoxy surface by Van de Walls interaction) to create an amine termination to a urethane chain. Since amines will react with an oxione in a chain-extending manner, the urethane and epoxy may enhance the bond—covalently.

This does not explain the initial degradation observed with aromatic-oil epoxy. While not intending to be limited to any particular mechanism of action, one possible explanation of this phenomenon is that since ethanol is used to degrease the surface prior to bonding, and ethanol reacts with isocyanate to poison the urethane chain termination, residual ethanol would prevent the bond-enhancing phenomena mentioned above. All curves in FIG. 8 (expect A) show increasing bond strength after an initial decline.

The plasma-applied alumina-titania non-conductive coating performed very well. The surface of the non-conductive coating had a nearly-invisible seal coat that bonds extremely well to the porous surface and interstices of the plasma-applied alumina-titania. These coatings display improved physical characteristic when compared to oil or tar extended epoxy. Extremely high peel strength values were observed. The materials used to generate the peel strength data (i.e., surface treatments) are outlined in Table 1.

TABLE 1

Metal Surface Treatments

| Coating | Manufacture (catalog no.) | Composition | Application Method | Thickness (Mils) |
|---|---|---|---|---|
| A = Control | N/A | grit blast, solvent wipe | Brush | N/A |
| B | Advanced materials (CRO-2A) | $Cr_2O_3$ | Plasma | 3 |
| C | A-Flame (201-P2) | $Al_2O_3$-White | Plasma | 8 |
| D | A-Flame (V3A) | $Al_2O_3/TiO_2$ | Plasma | 4 |
| E | A-Flame (V1B) | $Al_2O_3$ | Plasma | 8 |
| F | Thermal Spray Tech (STI-1A) | $Al_2O_3$ | HVOF | 10 |
| G | A-Flame (202-P1) | $Al_2O_3$-Gray | Plasma | 9 |
| H | A-Flame (V3-8) | $Al_2O_3$—$TiO_2$ | Plasma | 6 |
| I | A-Flame (200-P2) | $Cr_2O_3$ | Plasma | 6 |
| J | Thermal Spray Tech (STI-1B) | $Al_2O_3$ | HVOF | 10 |
| K | Advanced Materials (3B) | $ZrO_2/YO_2$ | Plasma | 24 |
| L-Control | N/A | Coal-Tar Epoxy | Dip | 20 |
| M-Control | N/A | Aromatic Oil Epoxy | Dip | 20 |
| N | A-Flame (V2-B) | $Al_2O_3$—$TiO_2$ | Plasma | 8 |
| O | A-Flame (V2-A) | $Al_2O_3$—$TiO_2$ | Plasma | 8 |

FIG. 9 reveals curves for three alumina ($Al_2 0_3$) non-conductive coatings. Coating F and J were applied by high velocity oxyfuel (HVOF) technique (See section 2.1.2) and coating E by plasma gun. A seal coat of an epoxy was used over these embodiments of the metal coupon surfaces with the NC coatings as well. The peel strength performances for these non-conductive coatings were excellent.

FIG. 10 shows a collection of non-conductive coatings. All were plasma applied. Coating G was a gray-colored alumina, H was an alumina-titania mix, I was chromium oxide, and K was a zirconium oxide/yttrium oxide mixture. Once again an epoxy seal coat was applied to all non-conductive coatings in this group. K under-performed the standard. Outperforming the standard was coating H, a alumina-titania mixture. Coating G, an alumina material, provided consistent performance. Coating I, chromium oxide ($Cr_2 0_3$), over-performed the standard.

FIG. 11 displays curves for plasma-applied $Cr_2O_3$ (B), $Al_2O_3$(C), and $Al_2O_3/TiO_2$(D); all had an epoxy seal coat. Coatings B and particularly C under-performed the standard. Coating D slightly outperformed the standard. Coating C displayed poor structural integrity in the coating itself. The application technique (plasma temperature, velocity, etc.) and thickness are thus important as the material choice for coating.

Peel strength plots for porcelain non-conductive coating are absent. They did perform well, however materials handling problems (See Section 2.3) render these as non-conductive coating systems less preferred in some applications. Moreover, the glassy surface may reduce long-term bond integrity unless the surface is etched.

Coupon Test Results Summary

Plate level tests reveal several non-conductive coatings that display resistance to cathodic delamination. While the epoxy formulations performed well, the following factors were noted with regard the application method used:

The thickness was outside the desired value of 10 mils (0.25 mm).

The coating was prone to brittleness and chipping.

Uniform coating thickness was difficult to maintain.

Accordingly, the epoxy-based formulations are less preferred as coatings.

Several inorganic non-conductive coatings were tried. Some were cost prohibitive. The most consistent and cost effective non-conductive coating was a alumina/titania mixture applied by plasma spray. This product and technique was used in full-article tests, which are described in Example 6.

EXAMPLE 6

The Full Article Test

The present example is provided to demonstrate a full article testing of a metal backshell that was coated according to the present invention.

The coating material of alumina and titania mixtures was used in the present examples. Full-article testing is primarily an accelerated life test that simulates the environmental conditions a connector would see on a submarine. Test specimens are also subjected to a variety of conditions that emulate the in-service environment. The times of exposure are given in hours and equal the amount of exposure specimens would typically see in the marine use in one year. A summary of the different conditions and the time to equal one equivalent year are:

Dry Heat (70° C.) 24 hours

Wet Thermal Soak (70° C.) 218 hours

Wet Thermal Cycling (0–68° C.) 79 cycles (79 hours)

Pressure Dwell (1500 psig) 18 hours

Pressure Cycling (0 psig–1500 psig) 1 cycle (0.2 hours)

One equivalent year: ~345 hours total

Dry heat represents a dry dock maintenance or storage environment. Wet conditions mimic warm seawater exposure and temperature ranges of the water from location and depth changes during submarine service. Likewise pressure dwell and cycling simulate submarine service exposures.

The Test Connectors were prepared and molded in the following manner:

Mark connector for identification

Clean connector with ethyl alcohol and let dry.

Paint primer coat on connector and let dry.

Apply mold release to the inside of connector mold.

Place connector and cable in mold and close mold.

Inject polyurethane molding compound.

Place mold and connector in a preheated oven and let stand for a minimum of four hours prior to demolding.

Connectors were placed in test after molding. The connectors were connected to a zinc anode during the test to provide a voltage potential.

The X-axis in FIGS. 12 and 13 represent linear movement in the radial direction of the peel strip as it is tensioned in the Instron. The Y-axis is peel strength expressed in pounds per linear inch of width for the peel strip or PLI—the prevailing unit of measure for such measurements. The ramp up in PLI evident for each sample is the result of initial tensioning of the sample. The individual peel curves thereafter line out at a value that is indicative of the bond strength. A sharp plunging drop off indicates that either the rubber failed cohesively or the adhesive bond failed.

In FIG. 12, all standard peels had a sharp drop off in the range of 20 to 40 PLI and that the non-conducive coating peels ranged between 45 and 80 PLI. Accordingly the NCC initial (time zero) bond strengths are superior to the standard. Also observed was a cohesive failure for one of the NCC peels—the rubber breaks before the bond fails.

FIG. 13 provides five equivalent year data. The enhancement in bond strength provided by NCC is unambiguous; bond tenacity between rubber and backshell is approximately double.

The specimens are exposed to the above conditions long enough to equal one equivalent year in each condition, then the cycle continues for successive equivalent years. Every few equivalent years the specimens are removed and a peel test is conducted to test the bond strength and durability of the urethane to the connector.

Both coatings were plasma applied alumina and titania mixtures. The plasma coating system was chosen because it out performed other coating systems in bond strength and durability tests. Also, the cost to apply the plasma coating was less than other thermomechanical systems with the application quality being more repeatable than epoxy or other brush applied coatings.

In the present examples the plasma coatings were applied in four steps. First, the part to be coated is cleaned and or gritblasted. This step is not necessary but is common practice when dealing with metals. The second step is to apply a coating of the base metal to the part to be coated. This metal oxide coating is only 0.0001 to 0.001 inches thick. The purpose of this coating is to have virgin metal without oxides in the oxygen free gas envelope present during the plasma coating process. After the base metal is applied, the actual coating is applied (in our case the alumina and titania mixture in 87% and 13% respectively. Finally, a seal coat of Metco AP was applied. This seal coat filled any porous voids in the metal oxide coating. FIG. 18 shows a schematic of a generic backshell and the metal oxide coating.

CPT2

FIG. 15 shows the overall results of the total 15 equivalent years (EY). The lines cutting through the data points are polynomial curve fits of that data. From the graph, the standard coating is shown to degrade quickly in the first years. A peel strength of less than 10 pounds per linear inch (pli) is considered a bond failure. This failure level is reached just over 3 EY for the standard backshells in test. After 15 EY, coated backshells lost less than 16% of its original bond strength. This indicates that the coating can provide for backshells that far exceed traditional bonding techniques. The backshells have over 5 times the life of standard backshells without the coating.

The Coating Area Test

The coating area test was conducted to determine if the molds used to mold the coated connectors would have to be modified. Theoretically a modification may be necessary to accommodate for the diameter increase from the coating. The diameter would increase 0.020 ±0.005 inches as a result of the coating. The following test setup was used to demonstrate that no such modifications were needed with the present invention.

Test Setup

Figure 4A:
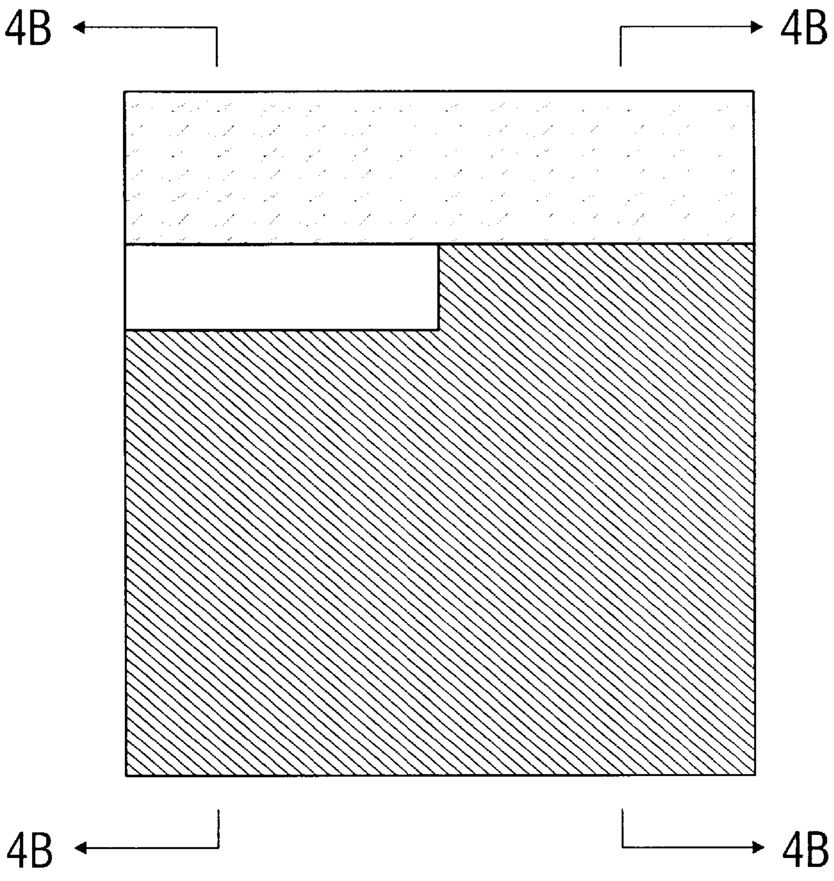
FIG. 4A and FIG. 4B. Schematic of Bond Area Test; 15=polyurethane layer; 16=pull tab.
Figure 4B:
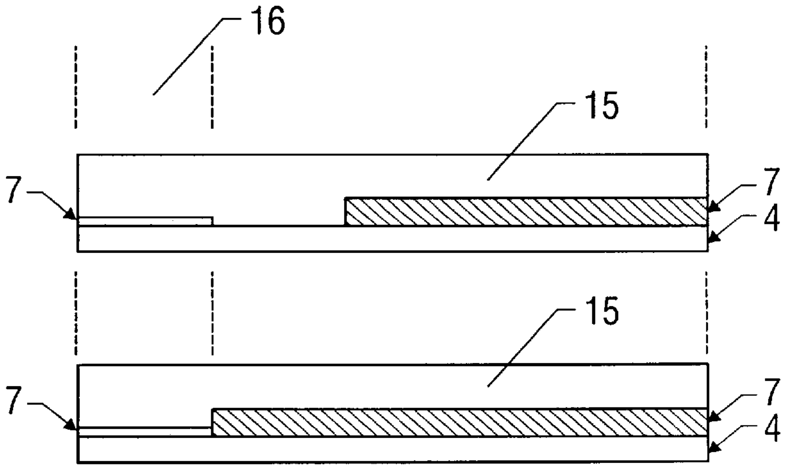
Figure 5:
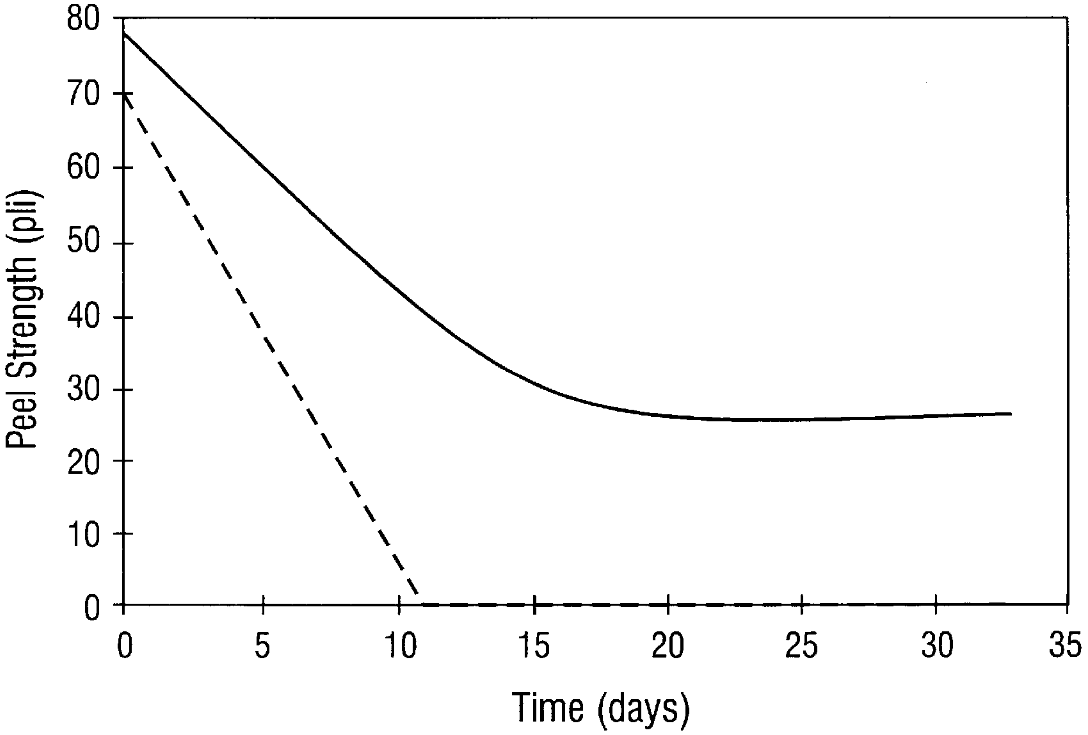
FIG. 5. Coupon Test Data; long term of 33 days; Graph of Peel Strength for the standard coating (coating of primer only) and non-conductive coating of alumina and titania oxide.

The test was setup similar to the coupon test described in example 5. Two plates were coated as shown in FIG. 4A and 4B. The urethane is molded over the coating and the metal substrate of the plate. The urethane coated the area of the surface having the metal oxide coating only. The pull tabs were not molded to the substrate, but to a slip material. The nonbonded tab was used to grasp the peel specimen. The test lasted 33 days. Within 11 days the urethane debonded from the metal substrate but not the NCC coated substrates. FIG. 5 shows the peel data at 0 days, 19 days, and 33 days.

The graph shows that the metal oxide coating improves the bond strength of the urethane no matter where the coating lies under the urethane. Therefore, the coating can be applied in such a manner as to not disturb the current molds.

EXAMPLE 7

ELEVATED HUMIDITY MOLDING TEST

The objective of the elevated humidity test was to simulate molding of a connector-cable assembly in an elevated temperature and humidity environment, such as in ballast tank or at a dry dock facility.

Two stainless steel plates were used. One had the inorganic non-conductive coating, the other had no coating. Each plate was taped and divided to produce four specimens. Each specimen measured 0.5 inches wide by 3.0 inches long and 0.25 inches thick (nominal).

After the borders were made, the plates were rinsed with ethanol to remove dust and oils. Next, mold release was applied to the tape to allow easy removal of excess urethane. The plates were then placed in a chamber that had an elevated temperature and humidity (37° C. and 95% RN average). The temperature and humidity were obtained through boiling water within the chamber.

Once the plates were in the chamber they were primer coated and allowed to dry in the chamber. After letting the primer dry for one hour the urethane was poured and allowed to stand for 10 minutes. Finally, the urethane was placed in an oven for four hours at 92° C. After the plates were removed from the oven the plates were placed at room temperature for two days.

The plates were clamped to the Instron in such a way to allow each sample to be peeled. The testing software was setup to run peel type tests, and data was collected. The results from the peels are as follows:

TABLE 2

| Coated Specimens | Average Peel Strength (lbf/in) |
|---|---|
| 1 | 84.3 |
| 2 | 85.7 |
| 3 | 80.7 |
| 4 | 76.7 |
| 4B* | 76.8 |
| Average of Coated Specimens | 80.86 |
| **Noncoated Specimens** | **Average Peel Strength (lbf/in)** |
| 1B | 73.6 |
| 2 | 63.6 |
| 2B | 58.6 |
| 3 | 74.2 |
| 4 | 67.0 |
| 4B | 78.4 |
| Average of Noncoated Specimens | 69.2 |

*Specimen numbers followed by a "B" indicate a second peel attempt.

As Table 2 shows, the specimens on the coated plate averaged 11.6 lbf/in higher than the noncoated plate specimens. The major failure during the peel test was adhesive failure between the primer and urethane. This is thought to be due to the high humidity environment reacting with the primer. Small amounts of primer peeled away with the specimens. This type of failure was insignificant.

It is interesting to note that peel strengths from plates cast in high-humidity conditions were as good or better than peels from plates cast in ambient temperature/humidity conditions. One explanation of the enhanced bond strength phenomena is pre-warming of the plates such that casting is directly onto a warm surface. Preheated surfaces may therefore be preferred to achieve superior bonds compared to use of cold surfaces.

EXAMPLE 8

METAL OXIDE AND CERAMIC BLENDS; ENHANCEMENT OF BOND STRENGTH

The present example provides particular examples of the metal oxides and other materials used in various aspects of the coating useful in the present invention. The methods of application (i.e., plasma) that were used with each are also described.

TABLE 3

| List of Coatings/Materials | |
|---|---|
| **I. Application Type** | **Plasma** |
| Application Gun Type | AP-3 |
| Gun Manufacturer | A-Flame |
| *Bond Coat | Yes |
| Bond Coat Material | Cat No. A-F#101 (Metco) |
| Coating Material | Light-grey $Al_2O_3$ |
| Coating Material Mfg. | Metco (cat. No. F #201) |
| Sample # (Coating Thickness)-Plate | 202P1 (0.009") (0.2206 mm) |
| Sample # (Coating Thickness)-Plate | 200P2 (0.010") (0.2540 mm) |
| *Bond Coat | Yes |
| Bond Coat Material | Metco Cat. No. A-F#101 |
| Coating Material | White Alumina Oxide; Metco Cat. No. A-F#12 |
| Sample # (Coating Thickness)-Plate | 201P1 (0.011") (0–2794 mm) |
| Sample # (Coating Thickness)-Plate | 201P2 (0.008") (0.2032 mm) |
| *Bond Coat | Yes |
| Bond Coat Material | Metco Cat. No. A-F#101 |
| Coating Material | Dark-grey Metco Cat. No. $Cr_2O_3$ A-F#15 |
| Sample # (Coating Thickness)-Plate | 200P1 (0.007") (0.1778 mm) |
| Sample # (Coating Thickness)-Plate | 200P2 (0.006") (0.1524 mm) |
| **II. Application Type** | **Plasma** |
| Application Gun Type | 9MB |
| Gun Manufacturer | Metco |
| *Bond Coat | Yes |
| Bond Coat Material | Metco Cat. No. A-F#101 |
| Coating Material | Metco Cat. No. A-F#17 |
| Sample #(Coating Thickness)-Plate | V1A (0.008") (0.2032 mm) |
| Sample #Coating Thickness)-Plate | V1B (0.008") (0.2032 mm) |
| Bond Coat Material | Metco Cat. No. A-F#101 |
| Coating Material | $Al_2O_3/TiO_2$ Combination |
| Coating Material Mfg. | Metco Cat. No. A-F#303 |
| Sample #(Coating Thickness)-Plate | V3A (0.008") (0.2032 mm) |
| Sample #(Coating Thickness)-Plate | V2C (0.009") (0.2286 mm) |
| *Bond Coat | Yes |
| Bond Coat Material | Metco Cat. No. A-F#101 |

TABLE 3-continued

| List of Coatings/Materials | |
|---|---|
| Coating Material | $Al_2O_3/TiO_2$ Combination |
| Coating Material Mfg. | Metco Cat. No. A-F #303 |
| Sample #(Coating Thickness)-Plate | V3A (0.004") (0.1016 mm) |
| Sample #(Coating Thickness)-Plate | V3B (0.006") (0.1524 mm) |
| III. Application Type | Plasma |
| Bond Coat | No |
| Coating Material | 99% Pur Aluminum Oxide |
| Sample #(Coating Thickness)-Plate | #1A (0.0655") (0.1397 mm) |
| Sample #(Coating Thickness)-Plate | #1B (0.005") (0.1270 mm) |
| *Bond Coat | No |
| Coating Material | 98% Pur Chromic Oxide |
| Sample #(Coating Thickness)-Plate | #2A (0.003") (0.2762 mm) |
| Sample #(Coating Thickness)-Plate | #2B (0.0095") (0.2413 mm) |
| *Bond Coat | Yes |
| Bond Coat Material | NiChrAl Bond Coat |
| Coating Material | 92% Zirconium Oxide/8% Yttrium Oxide/ Stabilizer |
| Sample #(Coating Thickness)-Plate | #3A (0.007") (0.1778 mm) |
| Sample #(Coating Thickness)-Plate | #3B (0.024") (0.6096 mm) |
| IV. Application Type | Plasma |
| Application Gun Type | 3M Plasma Gun |
| Gun Manufacturer | Metco |
| *Bond Coat | Yes |
| Bond Coat Material | 14–316 S/S |
| Coating Material (Titania) | 97% Aluminum Oxide/3% Oxide |
| Coating Material Mfg. | Norton Cat. No. 117 |
| Sample #(Coating Thickness)-Plate | #117 (0.009") (0.2286 mm) |
| Sample #(Coating Thickness)-Plate | #117 (0.012") (0.3048 mm) |
| *Bond Coat | Yes |
| Bond Coat Material | 14–316 S/S |
| Coating Material | #107–87% Aluminum Oxide/13% Titania Oxide |
| Coating Material Mfg. | Norton Cat. No. 107 |
| Sample #(Coating Thickness)-Plate | #107 (0.013") (0.3302 mm) |
| Sample #(Coating Thickness)-Plate | #107 (0.013") (0.3302 mm) |
| *Bond Coat | Yes |
| Bond Coat Material | 14–316 S/S |
| Coating Material | Aluminum Oxide/40% Titanium/Titania Oxide 60% |
| Coating Material Mfg. | Norton Cat. No. 109 |
| Sample #(Coating Thickness)-Plate | #109 (0.013") (0.3302 mm) |
| Sample #(Coating Thickness)-Plate | #109 (0.013") (0.3302 mm) |
| V. Application Type | Plasma |
| *Bond Coat | None |
| Bond Coat Material | N/A |
| Bond Coat Mat. Mfg. | N/A |
| Coating Material (Sealant) | 98% Superfine white Al Oxide/0.5% Silicon Dioxide/1.5% Other Oxides (Phenolic Sealant) |
| Sample #(Coating Thickness)-Plate | FSC 2105SF-#1 (0.005") (0.1270 mm) |
| Sample #(Coating Thickness)-Plate | FSC 2105SF-#2 (0.007") (0.1778 mm) |
| *Bond Coat | None |
| Bond Coat Material | N/A |
| Bond Coat Mat. Mfg. | N/A |
| Coating Material (Sealant) | 98% Chrome Oxide/2% other oxides (Phenolic Sealant) |
| Sample #(Coating Thickness)-Plate | FSC 2106SF-#1 (0.005") (0.1270 mm) |
| Sample #(Coating Thickness)-Plate | FSC 21065F-#2 (0.007") (0.1778 mm) |
| *Bond Coat | None |
| Coating Material (Sealant) | 92% Chromium Oxide/5% Silicon Dioxide/3% Titanium Dioxide (Phenolic Sealant) |
| Sample #(Coating Thickness)-Plate | FSC 2136F-#1 (0.005") (0.1270 mm) |
| Sample #(Coating Thickness)-Plate | FSC 2136F-#2 (0.008") (0.2032 mm) |
| VI. Application Type | HVOF/Plasma/Plasma |
| Coating Material | 99.59% Aluminum Oxide, 0.03% Iron Oxide, 0.36% Other Oxides (HVOF) |
| Sample #(Coating Thickness)-Plate | #1A (.010) (0.2540 mm) |
| Sample #(Coating Thickness)-Plate | #1B (.010) (0.2540 mm) |

TABLE 3-continued

| List of Coatings/Materials | |
|---|---|
| VII. Application Type | HVOF/Plasma/Plasma |
| Coating Material | 99.59% Aluminum Oxide, 0.03% Iron Oxide, 0.36% Other Oxides (HVOF) |
| Coating Material Mfg | Miller Thermal, Inc. |
| Sample #(Coating Thickness)-Plate | #1A (.010) (0.2540 mm) |
| Sample #(Coating Thickness)-Plate | #1B (.010) (0.2540 mm) |
| *Bond Coat (Thickness) | Yes (0.005" thick) (0.1270 mm) |
| Bond Coat Material | Praxair Cat. No. NI-106 |
| Bond Coat Mat. Mfg. | Praxair Surface Technologies |
| Coating Material (Sealant) | 95.89% Chromium Oxide, 3.79% Silicon Oxide, 0.13% Alum. Oxide, 0.19% Iron Oxide (Plasma)(ENVIBAR-UV1244T by Union Carbide Chemicals and Plastics Company, Inc.) |
| Coating Material Mfg. | Norton Materials (Saint-Gobain Industrial Ceramics) |
| Sample #(Coating Thickness)-Plate | #2A (.012) (0.3048 mm) |
| Sample #(Coating Thickness)-Plate | #2B (.010) (0.2540 mm) |
| *Bond Coat (Thickness) | Yes (0.005" thick) (0.1270 mm) |
| Bond Coat Material | Praxair (NI-106) |
| Bond Coat Mt. Mfg. | Praxair Surface Technologies |
| Coating Material (Sealant) | 88.33% Zirconium Oxide, 7.25% Yttrium Oxide (Stabilizer), 4.42% Other Oxides (Plasma)(ENVIBAR-UV1244T by Union Carbide Chemicals and Plastics Company, Inc.) |
| Coating Material Mfg. | Praxair Surface Technologies, Inc. (Specialty Powders) |
| Sample #(Coating Thickness)-Plate | #3A (.010) (0.2540 mm) |
| Sample #(Coating Thickness)-Plate | #3B (.010) (0.2540 mm) |

EXAMPLE 9

SEALANT vs. NON-SEALANT COATED METAL OXIDE TREATED METAL SURFACES

The present example is provided to demonstrate the utility of the present invention as a metal surface treatment with or without a coating or film of sealant, such as the phenolic sealants described in some embodiments of the invention.

An issue that arose during the full article test was whether or not the seal coat was needed. Studies were conducted in order to clarify this issue. The results demonstrate that the seal coat does not enhance bond strength or durability. This investigation was conducted using the coupon test and involved two coated plates, one with a seal coat and one without the sealer.

Metal surface was 3216L stainless steel, bond coat was 316L; also, coating was 87% alumina, 13% titania, seal coat was Metco APm, bond coat thickness was (0.001")0.0254 mm; coating was about (0.010")0.254 mm.

FIG. 5 is a graph of the peel strength data results. The graphs indicate that the bond strength is increased initially. The points at 19 and 33 days demonstrate that the strengths are approximately the same. This would imply that the seal coat is not necessary but still may be used as an additional coating practice. Also, the particular seal coat used in this testing should prove quite effective for neoprene molded connectors.

EXAMPLE 10

METAL TO METAL DURABILITY

The present example demonstrates a method whereby superior metal to metal adhesiveness may be achieved by employing the metal oxide coatings of the present invention at the metal surface prior applying a standard adhesive, such as an epoxy. The present example also demonstrates the utility/use of metal oxides as structural adhesive surface preparation technique.

Adhesive bonding is an extremely attractive technique for joining materials since it provides for the efficient transfer of stresses, eliminates sites of stress concentration common to the use of mechanical fasteners. With adhesives also substantial weight savings may be obtained. However, with adhesive bonding of metals, significant effort must be expended toward surface preparation. The surface preparation of metals many times involves the use of volatile, environmentally controlled cleaning solvents and conversion coatings. With increasing environmental regulations on the use of a number of solvents, new environmentally compliant methods of providing good adhesive bond durability are desired.

A reduction in the use of solvent cleaners in surface preparation may be a benefit of this technique also, as preparations that exclude these kinds of cleaners are less environmentally hazardous. Specimens of a silicon aluminum bronze alloy in which the metal had been treated were prepared using two different methods: 1) the metal was treated using traditional metal surface pretreatment; i.e., the surface was vapor degreased with ethanol, grit blasted with #60 Aluminum oxide, and again rinsed with ethanol (control) and (2) the second metal surface had been plasma sprayed with a metal bond coat and overcoated with a metal oxide coating (test sample). Wedge specimens were fabricated with a bond thickness of thirty mils. It is widely accepted that wedge tests are used to discriminate effectively between the effectiveness of different surface treatments. (J. D. Minford, (1983), In: Durability of Structural Adhesives, A. J. Kinloch, editor; Applied Science Publishers.) The following table lists useful adhesive compositions/adhesives that may also be used in conjunction with the present invention.

| Adhesive Compositions/Adhesives | |
|---|---|
| Epoxy Resin (Epon 828) | 71.43% |
| Amine Curing Agent (DETA) | 10.71% |
| Rubber Modifier (ATBN) | 17.86% |

The present example employed ceramic coatings as described in example 2. Silicon aluminum bronze, which had been previously coated with titanium oxide and alumina, was used. This was cut into 1" wide specimens for preparation of wedge specimens. A standard epoxy adhesive was used to bond the two adherends together. Crack length was monitored after insertion of the wedge. The ceramic surface treated with titania and alumina was compared to bare metal specimens prepared by grit blasting followed by bonding with epoxy.

After insertion of the wedge, crack propagation as a function of time was followed in the specimens. The results we found are exhibited in FIG. 16. The results indicate that the plasma sprayed surface is more resistant to crack propagation and hence more durable than the traditionally prepared surface. Surprisingly, although the plasma sprayed surface is relatively smooth, it produced a more durable bond than the extremely rough metal surface produced by grit blasting. This may indicate that this method of metal preparation by plasma spraying of non-conductive metal oxide and other non-conductive coatings may find applicability as a surface treatment method prior to adhesive bonding of metal substrates.

Peel Strength units are pounds per inch width. This refers to the load required to peel a specimen off of a stationary base with a known width and is common in the adhesives industry. Submarine Equivalent Years is the number of simulated years the connectors have been replaced during the accelerated life test. The data shows that the coating increases initial (zero EY) bond strength. The graph at FIG. 16 shows that the coated connectors according to the present invention start with a superior bond strenth that is maintained and superior to standard, non NCC-coated connectors.

The advantages of plasma spraying for surface preparation are multifold: 1) the metal surface is inert to corrosion and electrochemical processes prior to and after bonding 2) greater bond durability is achieved as compared with traditional methods of surface pretreatment 3) the metal surfaces can be sprayed prior to or at the site 4) no volatile organic solvents or ozone depleting solvents are used the method. Although adhesive durability testing was only conducted using the silicon aluminum bronze alloy adherends, similar results could be expected using both many ferrous and non-ferrous metals given the present disclosure.

The ceramic surface treated with the metal oxide preparation outperformed the specimen that had been grit blasted, and did not have metal oxide treatment. This result demonstrates that grit blasting prior to treatment with metal oxide is not necessary to achieve the enhanced adherence between metal surfaces described herein. This improvement in durability approaches that obtainable with silane coupling agents. The combination of ceramic surface treatment with silanes may produce a bond more durable than silanes or ceramic alone.

EXAMPLE 11

PRODUCTION EXAMPLE OF BACKSHELL CONNECTOR COATED WITH ALUMINUM OXIDE AND TITANIUM OXIDE BLEND

The present example describes a specific example of a device having a metal surface that is treated according to the present invention with metal oxide. The device was a backshell connector and was treated to include a coating of aluminum oxide and titanium oxide. This coating included about 100% of these metal oxides.

1. Materials. Connector plugs:
   - MIL-C-24217/x-x (stainless steel, 316L)
   - MIL-C-24231/3-001 (Monel)
   - MIL-C-22539 (316L stainless steel)
   - Bond coat thermal spray coating (same as plug material)
   - Aluminum oxide/titanium dioxide composite (87:13, respectively)
   - PR-420 adhesive primer (polyurethane based)
   - PR-1547 polyurethane molding compound Other plug components were obtained from standard kits (electrical socket contacts, inserts, retainers)

Cable (DSS-3, 2SWF-7, 2SWF-14 or -24.

The metal backshell connectors were treated according to the following steps:

Step 1. A bond coat of the metal of which the backshell connector was made was applied to the metal surface by a thermal spray technique on each plug specifically over the surface areas to be coated with the non-conductive coating (NCC) of metal oxides comprising 87% alumina and 13% titania oxides. The inclusion of a bond coat on the metal surface provides a toothy surface that will provide greater surface area for the adherence and application of the NCC metal oxides coating. Application thickness of the bond coat was around 1 mil (0.0254 mm) (0.001") or less.

Step 2. A metal oxide coating (87% alumina/13% titania) was then applied over the area of the plug to be overmolded with polymeric boot, in this case polyurethane.

Step 3. Assemble connector plug, including installation of socket contact insert assemblies (etc., as applicable) and wire to cable.

Step 4. Clean plug and metal oxide coated surfaces with ethanol alcohol and allow to dry.

Step 5. Prepare PR-420 Courtaulds Aerospace, adhesive primer A and B in accordance with manufacturer's recommendations in clean aluminum sample tray. Mix ratio determined by weight method.

Step 6. Apply PR-420 primer to metal oxide coated surface on plug and allowed to dry (about 30 minutes minimum).

Step 7. Place plug into mold and fixe mold closed with screws.

Step 8. Mix and degass PR-1547 molding compound (Courtaulds Aerospace) in accordance with manufacturer's recommended procedures (a polyurethane).

Step 9. Pour degassed molding compound into plastic cartridge.

Step 10. Inject molding compound from cartridge into mold until full.

Step 11. Place mold with cable and connector plug into warm oven (70° C.) and allow to cure (about 16 hours minimum).

Step 12. Remove mold and plug assembly from oven and allow to cool to room temperature.

Step 13. Open mold and remove cable connector assembly.

Several of the above described steps may be eliminated and still provide the metal oxide coated metal surfaces of the present invention.

BIBLIOGRAPHY

The following references, to the extent that they provide exemplary procedural or other details supplementary to those set forth herein, are specifically incorporated herein by reference.

1. Callister, William D. (1991), Applications and Processing of Ceramics, In: "Materials Science and Engineering, An Introduction", John Wiley and Sons, Inc. Publishers, pp. 430–455.
2. Allen, et al., "Waterproof Electrical Connector", Navy Technical Disclosure Bulletin, Navy Tech. Cat. No. 1521, Navy Case No. 71102. Vol. 17, No. 1, December 1991.
3. Bray et al. (1993), Testing Cathodic Resistant Coatings for Underwater Electrical Conductors and Marine, Rubber-to-Metal Bonds, MTS '93 Conference Proceedings
4. D. M. Brewis et al. (1985), "Adhesion Problems with Paint and Powder Coatings" Industrial Adhesion Problems, Brews and Briggs, editors, pp 178–81.
5. Handbook of Epoxy Resins (1982), pp 7–11.
6. U.S. Pat. No. 4,874,324—Anderson (1989)
7. U.S. Pat. No. 3,688, 244—Lavoca et al. (1972)
8. U.S. Pat. No. 4,605,272—Myers et al. (1986)
9. U.S. Pat. No. 5,080,926—Poster et al.
10. U.S. Pat. No. 5,011,583—Sanshin Kogyo KKJP (1991)
11. U.S. Pat. No. 4,714,623—Riccio et al. (1987)
12. U.S. Pat. No. 4,678,692—Porter (1987)
13. U.S. Pat. No. 4,578,114—Rangaswamy (1986)
14. U.S. Pat. No. 3,864,093—Wolfla (1995)
15. U.S. Pat. No. 4,576,874—Spengler et al.
16. U.S. Pat. No. RE 30771—Zondek (1981)
17. W.P.I. Asses. No. 92-270904/33—Dom Oroslov et al.
18. J.P. 0608112 (Ya Wa)(1994) Nippar Steel Corp. (W.P.I. Ass. No. 94132379/16)
19. E.P. 35377-A—Bell (1981)
20. G.B. 2073248-A—Bell (1981)
21. G.B. 2073248-B—Bell (1981)

What is claimed is:

1. A device having a metal surface treated by the method of:

applying a thermal sprayed non-conductive metal oxide mixture as a coat to the metal surface to provide a coating having a thickness of about 0.1 mm to about 5 mm of said non-conductive metal oxide mixture, said metal oxide mixture comprising about 20% to about 99% non-conductive oxide.

2. The device of claim 1 further defined as an electrical connector.

3. A device having a metal surface including a thermally sprayed non-conductive metal oxide mixture as a coating having a thickness of about 0.1 mm to about 5 mm non-conductive metal oxide coating comprising about 20% to about 99% non-conductive metal oxide mixture.

4. The device of claim 3 wherein the non-conductive metal oxide mixture comprises about 80% to about 99% non-conductive metal oxide.

5. The device of claim 3 wherein the non-conductive metal oxide mixture coating is included on the metal surface at a thickness of about 0.23 mm.

6. The device of claim 3 wherein the metal surface is steel, stainless steel, monel aluminum silicon bronze, or a mixture thereof.

7. The device of claim 3 wherein the non-conductive metal oxide mixture comprises titanium oxide, aluminum oxide, or a mixture thereof.

8. The device of claim 7, the metal oxide mixture further defined as comprising between about 2% to 98% titanium oxide.

9. The device of claim 3 further comprising a polymer covering the metal oxide coating.

10. The device of claim 9 wherein the polymer is polyurethane or neoprene.

11. The device of claim 9 wherein the polymer is further defined as an encapsulating rubber boot.

12. The device of claim 3 further comprising an organic resin over the metal oxide mixture coating.

13. The device of claim 12 wherein the organic resin is a phenolic resin.

14. The device of claim 3 further defined as a connector backshell.

15. The device of claim 3 further defined as an underwater electrical connector.

16. The device of claim 3 further defined as a transducer.

17. An electrical connector device having a metal surface, the device being coated at least in part with (a) a thermally sprayed non-conductive metal oxide mixture layer having a thickness of about 0.1 mm to about 5 mm comprising about 20% to about 99% non-conductive metal oxide mixture;

(b) a ceramic layer; and (c) a coating layer.

18. The device of claim 17, wherein the ceramic layer is a porcelain.

19. The device of claim 17, wherein the coating layer is a phenolic resin.

20. The device of claim 17, wherein the coating layer is an epoxy.

* * * * *